(12) United States Patent
Ernström et al.

(10) Patent No.: US 11,070,338 B2
(45) Date of Patent: Jul. 20, 2021

(54) TRANSMISSION OR RECEPTION OF A REFERENCE SIGNAL IN A WIRELESS COMMUNICATION SYSTEM

(71) Applicant: Telefonaktiebolaget LM Ericsson (publ), Stockholm (SE)

(72) Inventors: Per Ernström, Stockholm (SE); Håkan Björkegren, Täby (SE); Mattias Frenne, Uppsala (SE); Lars Lindbom, Karlstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/617,551

(22) PCT Filed: Jun. 15, 2018

(86) PCT No.: PCT/EP2018/065956
§ 371 (c)(1),
(2) Date: Nov. 27, 2019

(87) PCT Pub. No.: WO2018/229256
PCT Pub. Date: Dec. 20, 2018

(65) Prior Publication Data
US 2020/0136767 A1   Apr. 30, 2020

Related U.S. Application Data

(60) Provisional application No. 62/521,340, filed on Jun. 16, 2017.

(51) Int. Cl.
*H04L 5/00* (2006.01)
*H04L 27/00* (2006.01)
*H04W 72/04* (2009.01)

(52) U.S. Cl.
CPC ............ *H04L 5/005* (2013.01); *H04L 5/0053* (2013.01); *H04L 27/0014* (2013.01);
(Continued)

(58) Field of Classification Search
CPC .... H04L 5/005; H04L 5/0053; H04L 27/0014
See application file for complete search history.

(56) References Cited

U.S. PATENT DOCUMENTS 7,751,503 B2   7/2010   Lawrow et al.
2004/0202234 A1   10/2004   Wang
(Continued)

FOREIGN PATENT DOCUMENTS

EP   2736208 A2   5/2014
WO   2010060732 A1   6/2010

OTHER PUBLICATIONS

Unknown, Author, et al., "3rd Generation Partnership Project; Technical Specification Group Radio Access Network; Evolved Universal Terrestrial Radio Access (E-UTRA); Physical channels and modulation (Release 14)", 3GPP TS 36.211 V14.2.0, Mar. 2017, pp. 1-194.
(Continued)

*Primary Examiner* — Ronald B Abelson
(74) *Attorney, Agent, or Firm* — Murphy, Bilak & Homiller, PLLC

(57) ABSTRACT

A radio node (12, 14) is configured to transmit or receive reference symbols (18) of a reference signal (16) on respective radio resources, including first and second sets (S1, S2) of radio resources that differ in at least one radio resource. The reference signal (16) may be for instance a tracking reference signal (16) configured for time or frequency tracking. The first set (S1) of radio resources includes a first pair of radio resources that are separated from one another in a radio resource domain by a first separation distance
(Continued)

(D1). The second set (S2) of radio resources includes a second pair of radio resources that are separated from one another in the radio resource domain by a second separation distance (D2). The radio resource domain may be a time domain or a frequency domain. In one or more embodiments, the second separation distance (D2) is at least twice as large as the first separation distance (D1).

24 Claims, 11 Drawing Sheets

(52) U.S. Cl.
CPC . *H04L 2027/0026* (2013.01); *H04W 72/0446* (2013.01); *H04W 72/0453* (2013.01)

(56) References Cited

U.S. PATENT DOCUMENTS

| | | |
|---|---|---|
| 2013/0010704 A1 | 1/2013 | Kronquist et al. |
| 2013/0114535 A1 | 5/2013 | Ng et al. |
| 2013/0121246 A1 | 5/2013 | Guey et al. |
| 2013/0170590 A1 | 7/2013 | Hyll et al. |

OTHER PUBLICATIONS

Unknown, Author, "On DL PTRS design", 3GPP TSG-RAN WG1 #89; R1-1708707; Hangzhou, China May 15-19, 2017, pp. 1-9.
Unknown, Author, "WF on RS design requirement for fine time and frequency tracking", 3GPP TSG RAN WGI #89; R1-1709640; Hangzhou, China, May 15-19, 2017, pp. 1-10.
Unknown, Author, "Draft Report of 3GPP TSG RAN WG1 #89 v0.1.0 (Hangzhou, China, May 15-19, 2017)", 3GPP TSG RAN WG1 Meeting #90; R1-171xxxx; Prague, Czech Rep, Aug. 21-25, 2017, pp. 1-162.

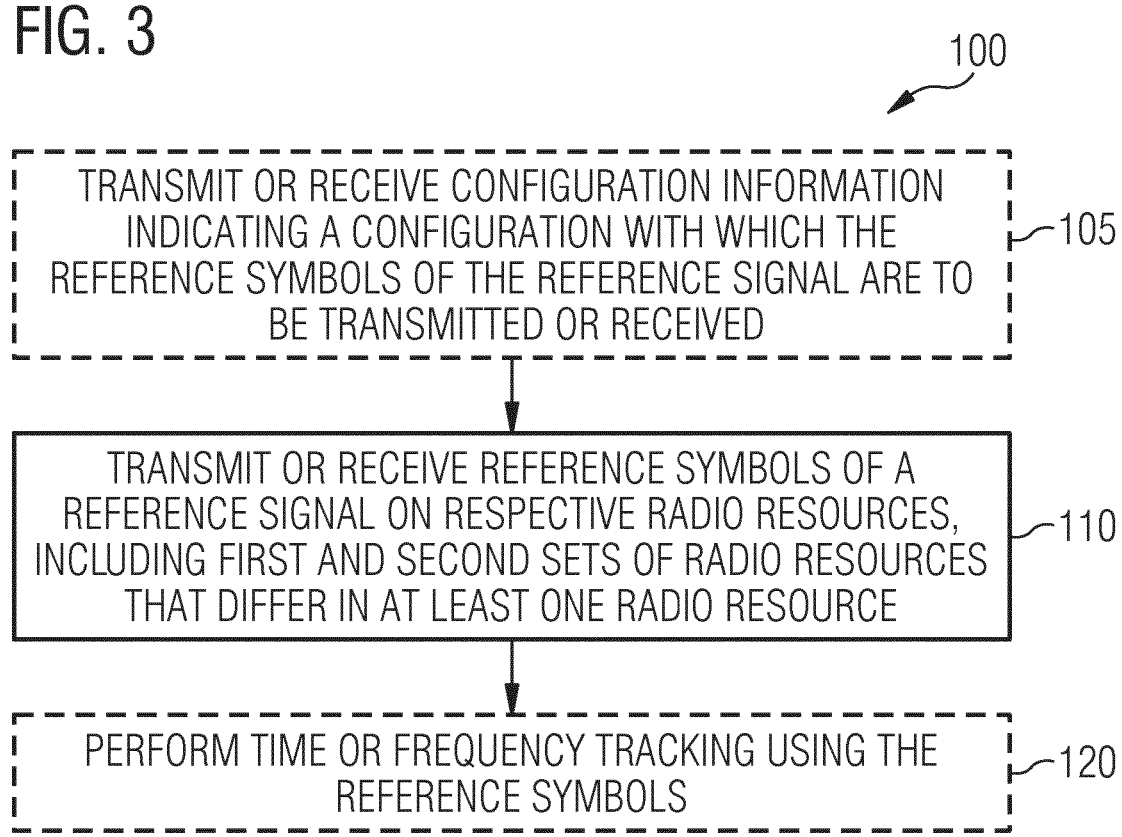

| SNR  | -12 | -11 | -9 | -7   | -4 | 0  | 5  | 10 | 15 | 20  | 25  |
|------|-----|-----|----|------|----|----|----|----|----|-----|-----|
| Loss | 5%  | 2%  | 2% | 0.1% | 2% | 1% | 2% | 4% | 9% | 14% | 23% |

TRANSMISSION OR RECEPTION OF A REFERENCE SIGNAL IN A WIRELESS COMMUNICATION SYSTEM

BACKGROUND

A receiver in a wireless communication system receives a signal by performing down-conversion of the signal to baseband using a local oscillator (LO) tuned to a certain frequency. Due to oscillator imperfections on both the transmitter and the receiver side, and due to Doppler shift of the signal, the frequency to which the receiver's LO is tuned may differ from the frequency at which the signal was transmitted. That is, there may be an offset between the receiver's LO frequency and the transmitted signal's frequency.

To maintain a proper frequency reference for its oscillator, the receiver performs frequency offset estimation so as to estimate the deviation of the LO frequency from the actual frequency of the transmitted signal, e.g., based on measurements of a known reference signal. The resulting frequency offset estimate may then be used to adjust the reference frequency in the oscillator to keep it from drifting away from the correct designated frequency, to compensate processing performed on the received signal, or both. In this way, the receiver effectively tracks the frequency of the received signal using a reference signal. A receiver may use a reference signal in a similar way for time tracking.

These and other uses of a reference signal prove to be challenging in some contexts where the overhead and/or interference attributable to a reference signal must be balanced with performance (e.g., frequency offset estimation accuracy).

SUMMARY

One or more embodiments herein include a method performed by a radio node (e.g., a wireless device or a radio network node) configured for use in a wireless communication system. The method may comprise transmitting or receiving reference symbols of a reference signal on respective radio resources, including first and second sets of radio resources that differ in at least one radio resource. The reference signal may be for instance a tracking reference signal configured for time or frequency tracking. In some embodiments, the first set of radio resources includes a first pair of radio resources that are separated from one another in a radio resource domain by a first separation distance, with no reference symbol of the reference signal on any radio resource between the first pair of radio resources in the radio resource domain. Similarly, in some embodiments, the second set of radio resources includes a second pair of radio resources that are separated from one another in the radio resource domain by a second separation distance, with no reference symbol of the reference signal on any radio resource between the second pair of radio resources in the radio resource domain. The radio resource domain may be a time domain or a frequency domain.

In one or more embodiments, the second separation distance is at least twice as large as the first separation distance. Alternatively or additionally, the second separation distance is at least three times as large as the first separation distance. Alternatively or additionally, the second separation distance is at least five times as large as the first separation distance.

In some embodiments, the reference signal is a tracking reference signal configured for use in tracking receiver frequency offset.

In some embodiments, the radio node is a wireless device. Alternatively or additionally in this regard, in some embodiments, transmitting or receiving the reference symbols in the method comprises receiving the reference symbols, and wherein the method further comprises performing frequency offset estimation based on the received reference symbols.

In other embodiments, the radio node is a radio network node. In one such embodiment, the method further comprises configuring a wireless device to receive the reference signal to perform frequency offset estimation.

In some embodiments, radio resources on which the reference signal is transmitted or received occur in periodically recurring bursts. In one such embodiment, the first and second sets of radio resources are included in the same burst. In fact, in one embodiment, the first set occurs before the second set in the same burst.

In any of these embodiments, transmissions may be performed in the wireless communication system according to a time slot structure in which each of multiple time slots includes multiple radio resources in time, and a burst spans multiple consecutive time slots. In one embodiment, each of the consecutive time slots spanned by any given burst includes one or more pairs of radio resources on which reference symbols of the reference signal are transmitted or received, with radio resources of each pair in the time slot separated by the same separation distance. Any pairs of the radio resources that have different separation distances may be included in different time slots of the given burst.

In some embodiments, at least one radio resource included in the first set is also included in the second set.

In some embodiments, the first set of radio resources is a subset of the second set of radio resources.

In some embodiments, the first set includes one or more pairs of radio resources that are each separated from one another in the radio resource domain by a respective separation distance, with no reference symbol of the reference signal on any radio resource between that pair of radio resources in the radio resource domain. In this case, the first separation distance may be a maximum separation distance among the one or more respective separation distances of the one or more pairs included in the first set.

In some embodiments, the second set includes one or more pairs of radio resources that are each separated from one another in the radio resource domain by a respective separation distance, with no reference symbol of the reference signal on any radio resource between that pair of radio resources in the radio resource domain. In this case, the second separation distance may be a maximum separation distance among the one or more respective separation distances of the one or more pairs included in the second set.

Regardless, in some embodiments, the radio resource domain is the time domain. In other embodiments, the radio resource domain is the frequency domain.

Alternatively or additionally, the reference symbols of the reference signal comprise Orthogonal Frequency Division Multiplexing (OFDM) symbols in some embodiments.

In some embodiments, the method further comprises transmitting or receiving configuration information indicating a configuration with which the reference symbols of the reference signal are to be transmitted or received on the respective radio resources. In one embodiment, for example, the method comprises transmitting or receiving the configuration information as dynamic control signaling. Alternatively or additionally, in some embodiments where transmissions are performed in the wireless communication system according to a time slot structure in which each of multiple time slots includes multiple radio resources in time, the method may comprises transmitting or receiving the configuration information as downlink control information at a beginning of a time slot. In still other embodiments, the method may comprise transmitting or receiving the configuration information as part of broadcast information.

Embodiments herein also include corresponding apparatus, computer programs, and carriers. For example, embodiments herein include a radio node configured for use in a wireless communication system. The radio node is configured to transmit or receive (e.g., via radio circuitry of the radio node) reference symbols of a reference signal on respective radio resources, including first and second sets of radio resources that differ in at least one radio resource. The first set of radio resources includes a first pair of radio resources that are separated from one another in a radio resource domain by a first separation distance, with no reference symbol of the reference signal on any radio resource between the first pair of radio resources in the radio resource domain. The second set of radio resources includes a second pair of radio resources that are separated from one another in the radio resource domain by a second separation distance, with no reference symbol of the reference signal on any radio resource between the second pair of radio resources in the radio resource domain. In some embodiments, the second separation distance is at least twice as large as the first separation distance. The radio resource domain may for instance be a time domain or a frequency domain.

Embodiments also include a computer program comprising instructions which, when executed by at least one processor of a radio node, causes the radio node to carry out the method of any of the above embodiments. Embodiments further include a carrier containing the computer program. The carrier may be one of an electronic signal, optical signal, radio signal, or computer readable storage medium.

In still other embodiments herein, an irregular, or variable, temporal pattern is used for the transmission and reception of reference signals that are used for frequency estimation. The temporal pattern is such that there is a subset of reference signals that are transmitted spaced closely in time (e.g. closely spaced OFDM symbols) while in general these reference signals are transmitted more sparsely spaced in time.

More specifically, the maximum time between consecutive signals in the subset G of reference signals should be such that aliasing is unlikely to occur based on the initial frequency estimate. The maximum time between consecutive signals in the set of all reference signals on the other hand can be allowed to be so large that aliasing is likely to occur based on the initial frequency estimate but should be small enough for aliasing to be avoidable with the help of a frequency estimate based on the subset G of reference signals.

On the receiver side, the frequency may be estimated in two steps. First the frequency is estimated based on the subset G of the reference signals. Next the frequency is estimated based on the full set of reference signals making use of the frequency estimate in the first step to avoid aliasing.

In some embodiments, therefore, a tracking reference signal (TRS) burst pattern consists of a sub pattern that is dense in time and thus robust towards aliasing given the initial frequency estimate.

Some embodiments give a better frequency estimation accuracy for a given reference signal overhead than currently used methods or alternatively the same frequency estimation accuracy as currently used methods but with a lower reference signal overhead.

BRIEF DESCRIPTION OF THE DRAWINGS

FIG. 3 is a logic flow diagram of a method performed by a radio node according to some embodiments.

DETAILED DESCRIPTION

Figure 1:
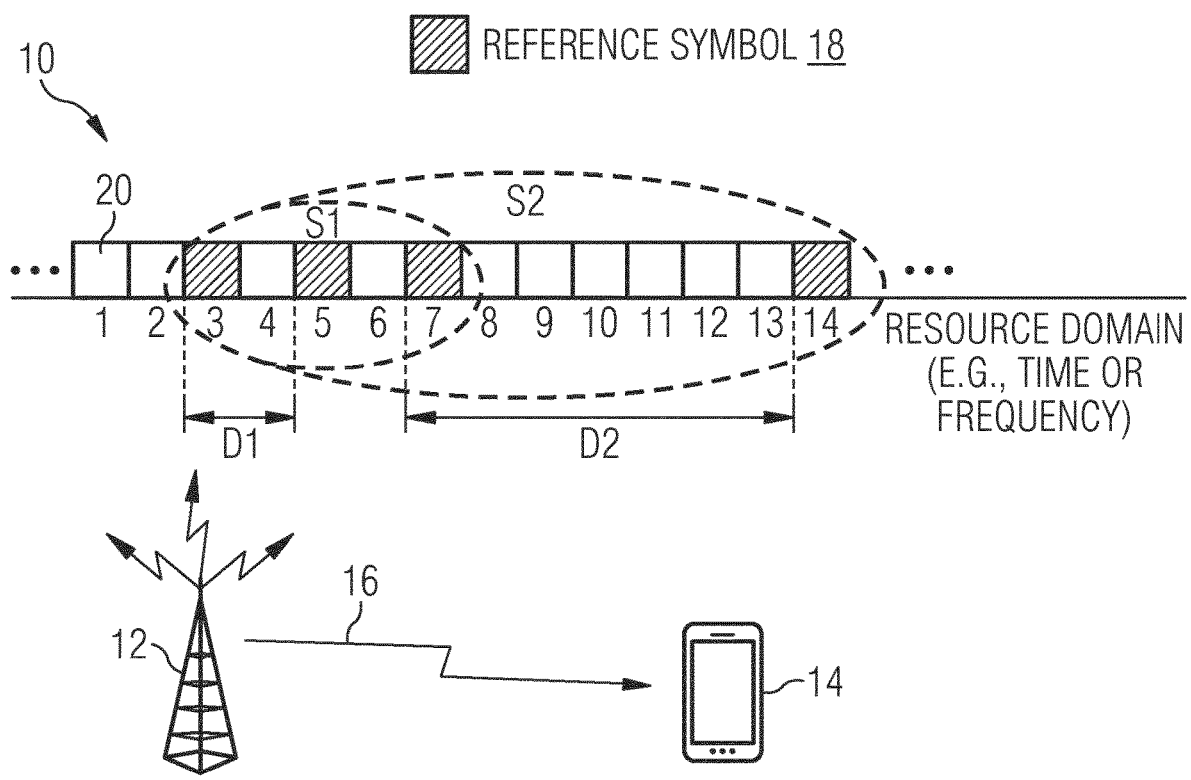
FIG. 1 is a block diagram of a wireless communication system with a transmit radio node and a receive radio node configured according to some embodiments.

FIG. 1 shows a wireless communication system 10 according to some embodiments. The system 10 includes a transmit radio node 12 configured to transmit a reference signal 16 to a receive radio node 14. FIG. 1 for instance shows the transmit radio node 12 in the form of a radio network node (e.g., a base station) and shows the receive radio node 14 in the form of a wireless device such as a user equipment, e.g., such that the reference signal 16 constitutes a downlink reference signal.

This reference signal 16 in some embodiments may be a tracking reference signal (TRS) configured for use by the receive radio node 14 for time and/or frequency tracking (e.g., frequency offset estimation). In one embodiment in this regard, the reference signal 16 is transmitted phase coherently such that all symbols of the reference signal 16 are transmitted with the same precoder, i.e., on the same antenna port.

In any event, FIG. 1 shows that the reference signal 16 comprises multiple reference symbols 18, e.g., in a certain sequence or series. These reference symbols 18 (e.g., in the form of Orthogonal Frequency Division Multiplexing, OFDM, symbols) are transmitted by the transmit radio node 12 and received by the receive radio node 14 on respective radio resources 20 defined in a radio resource domain (e.g., a time or frequency domain). FIG. 1 in this regard shows reference symbols 18 on radio resources 20 that are indexed for instance by indices 3, 5, 7, and 14. In some embodiments, no reference symbol 18 of the reference signal 16 is transmitted or received on any of the other radio resources 20 shown in FIG. 1, e.g., as these resources may instead be used for user data, control data, or other types of reference signals.

The radio resources 20 on which the reference symbols 18 may be transmitted and received may more specifically include a first set S1 of radio resources and a second set S2 of radio resources. The first and second sets S1, S2 may differ in at least one radio resource, e.g., the sets S1, S2 may be mutually exclusive or may partially overlap in terms of one or more radio resources. With partial overlap of the sets S1, S2, at least one radio resource included in the first set S1 may be also included in the second set S2. In fact, in some embodiments, the partial overlap is realized in that the first set S1 is a subset of the second set S2. FIG. 1 illustrates one example of such embodiments by showing that the radio resources 20 on which the reference symbols 18 are transmitted and received include a first set S1 and a second set S2. The first set S1 as shown includes radio resources 3, 5, and 7, whereas the second set S2 includes radio resources 3, 5, 7, and 14, i.e., the first set S1 is a subset of the second set S2.

With the sets S1, S2 differing in at least one radio resource 20, the sets may be associated with different spacings, patterns, and/or densities of radio resource in the radio resource domain for carrying reference symbols 18, e.g., such that the reference symbol radio resource density varies over time or frequency. The sets S1, S2 in this regard may for instance be associated with different maximum separation distances in the radio resource domain between radio resources 20 that carry reference symbols 18.

In some embodiments, for instance, the first set S1 includes a first pair of radio resources that are separated from one another in the radio resource domain by a first separation distance D1, with no reference symbol of the reference signal 16 on any radio resource between the first pair of radio resources in the radio resource domain (i.e., the radio resources in the first pair occur consecutively in an ordering of those radio resources that carry reference symbols 18 in the radio resource domain, ignoring radio resources that do not carry such reference symbols 18). And the second set S2 includes a second pair of radio resources that are separated from one another in the radio resource domain by a second separation distance D2, with no reference symbol of the reference signal on any radio resource between the second pair of radio resources in the radio resource domain. According to some embodiments herein, the second separation distance D2 is different than the first separation distance D1. In some embodiments, for instance, the second separation distance D2 is at least twice as large as the first separation distance D1. In other embodiments, the second separation distance D2 is at least three times as large as the first separation distance D1. In still other embodiments, the second separation distance D2 is at least five times as large as the first separation distance D1.

FIG. 1 for instance shows that the first set S1 includes radio resources 3, 5, and 7 which occur consecutively one after another in the radio resource domain with respect to radio resources that carry reference symbols 18 of the reference signal 16, i.e., they are shown as non-consecutive with respect to all radio resources including non-reference-symbol radio resources 4 and 6 intervening between them, but consecutive with respect to only radio resources 3, 5, 7, and 14 that carry reference symbols of the reference signal 16. In this case, then, the first set S1 includes two pairs of consecutive radio resources: one pair that includes radio resources 3 and 5 and another pair that includes radio resources 5 and 7. Each of these pairs do not have any radio resource between them that carries a reference symbol of the reference signal 16. Each pair is formed from radio resources that are separated from one another in the radio resource domain by a first separation distance D1, shown here as being 2 radio resources (i.e., 5−3=2).

Similarly, FIG. 1 shows that the second set S2 includes radio resources 3, 5, 7, and 14 which occur consecutively one after another in the radio resource domain with respect to radio resources that carry reference symbols 18 of the reference signal 16. This second set S2 differs in that it includes three pairs of consecutive radio resources: one pair that includes radio resources 3 and 5, another pair that includes radio resources 5 and 7, and yet another pair that includes radio resources 7 and 14. Whereas pairs 3-5 and 5-7 have the first separation distance D1, the pairing of resources 7 and 14 are separated by a second separation distance D2, shown as being equal to 7 radio resources (i.e., 14−7=7). In this case, then, the second separation distance D2 is actually more than twice as large as the first separation distance D1. In fact, the second separation distance D2 is at least three times as large as the first separation distance D1 (i.e., D2>N*D1, such that N=3 in this example where D1=2 and D2=7).

Note that, in this example, the first and second separation distances D1, D2 constituted the maximum separation distance among the pairs of radio resources in each respect set S1, S2. This maximum separation distance in a sense characterizes or reflects a density of the radio resources used for carrying reference symbols 18 of the reference signal 16. In general, therefore, according to some embodiments herein where the first set S1 includes one or more pairs of radio resources that are each separated from one another in the radio resource domain by a respective separation distance, with no reference symbol of the reference signal 16 on any radio resource between that pair of radio resources in the radio resource domain, the first separation distance D1 is a maximum separation distance among the one or more respective separation distances of the one or more pairs included in the first set S1. Similarly, where the second set S2 includes one or more pairs of radio resources that are each separated from one another in the radio resource domain by a respective separation distance, with no reference symbol of the reference signal on any radio resource between that pair of radio resources in the radio resource domain, the second separation distance is a maximum separation distance among the one or more respective separation distances of the one or more pairs included in the second set S2. In this case, then, the maximum separation distance of the second set S2 may be at least two times, three times, five times, etc. the maximum separation distance of the first set S1.

With the reference symbol radio resources spaced in this way, some embodiments herein facilitate time or frequency tracking by the receive radio node 14. Indeed, in some embodiments, the first separation distance D1 is less than or equal to an ambiguity or alias inducing separation distance which, when exceeded, ambiguity or aliasing in the estimated phases of the reference symbols 18 will or is (more) likely to occur. And the second separation distance is greater than the ambiguity or aliasing inducing separation distance, in favor of increased estimate accuracy or range. The ambiguity or aliasing inducing separation distance (e.g., in seconds) may be for instance one half divided by the actual, estimated, worst-case, or assumed error in the local oscillator frequency (Hz) with which the reference symbols 18 on the first set S1 of radio resources are or are assumed to be received. In any event, with the reference signal 16 transmitted or received in this way, some embodiments herein give a better frequency estimation accuracy for a given reference signal overhead than currently used methods or alternatively the same frequency estimation accuracy as currently used methods but with a lower reference signal overhead.

Figure 2:
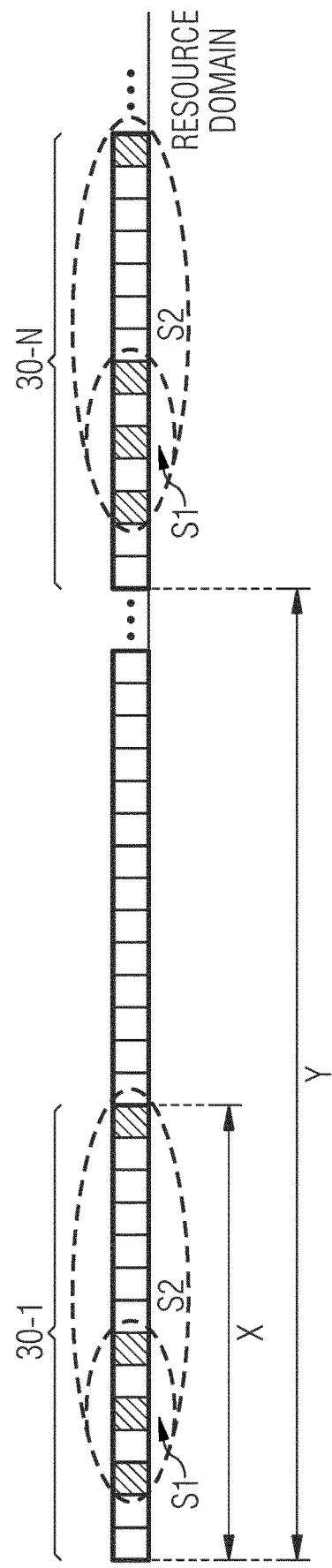
FIG. 2 is a block diagram of a reference signal transmitted or received in periodically recurring bursts according to some embodiments.

Note that, in some embodiments, radio resources on which the reference signal 16 is transmitted or received occur in periodically recurring bursts, e.g., such that the reference signal 16 is effectively transmitted or received in periodically recurring bursts. In one embodiment, for example, FIG. 1 illustrates just one of multiple periodically recurring bursts. FIG. 2 illustrates the periodicity with which the bursts occur according to one example.

FIG. 2 shows multiple bursts 30-1 . . . 30-N (referred to generally as bursts 30). Each burst 30 spans X=14 symbols, which as shown constitutes a single time slot 32. Four reference symbols 18 are included in each burst 30, e.g., as shown in FIG. 1 such that reference symbols 18 are transmitted or received on symbols 3, 5, 7, and 14 of each burst 30. The bursts 30 periodically recur with a periodicity Y (e.g., every Y slots). No reference symbols 18 of the reference signal 16 are transmitted between successive bursts 30. In the example of FIG. 2, then, the first set S1 and second set S2 of radio resources on which reference symbols 18 are transmitted or received are included in the same burst 30. That is, for any given recurrence of the reference symbols 18, each of the reference symbol radio resources included in the first set S1 is included in the same burst 30 as the burst within which are included each of the reference symbol radio resources included in the second set S2. Or, in other words, any given burst 30 includes each reference symbol radio resource in the first set S1 as well as each reference symbol radio resource in the second set S2. FIG. 2 for example shows that each of the reference symbol radio resources in first set S1 is included in burst 30-1 and each of the reference symbol radio resources in the second set S2 is also included in that same burst 30-1. In this case, the first set S1 occurs before the second set S2 in the same burst. The same may be said for burst 30-N; that is, each reference symbol radio resource in first set S1 is included in burst 30-N and each reference symbol radio resource in the second set S2 is also included in that same burst 30-N.

Effectively, this means that any given burst 30 itself provides different spacings, patterns, and/or densities of radio resource for carrying reference symbols 18, e.g., such that the reference symbol radio resource density varies within any given burst 30. In some embodiments, then, any given burst 30 includes some reference symbol radio resources (e.g., in S1) that are separated by less than the ambiguity or alias inducing separation distance as well as some reference symbol radio resources (e.g., in S2) that are separated by greater than or equal to the ambiguity or alias inducing separation distance. The receive radio node 14 may thereby exploit both separation distances within any given burst 30 for performing frequency offset estimation.

Of course, although FIG. 2 showed a burst 30 as spanning only a single time slot 32, a burst 30 in other embodiments may span multiple consecutive time slots 32. Even with a burst 30 spanning multiple time slots 32, the first and second sets S1, S2 may nonetheless still be included in the same burst 30 in some embodiments.

In other embodiments not shown, though, the first and second sets S1, S2 may be included in different bursts. For example, where the first and second sets S1, S2 are mutually exclusive, the first set S1 may be included only in one burst and the second set S2 may be included only in another burst. That is, all reference symbol radio resources in the first set S1 may be included in one burst whereas all reference symbol radio resources in the second set S2 may be included in a different bust. The receive radio node 14 in this case may exploit different separation distances within different respective bursts for performing frequency offset estimation.

In view of the modifications and variations disclosed, FIG. 3 shows a method 100 performed by a radio node (e.g., transmit radio node 12 or receive radio node 14) according to some embodiments. As shown, the method 100 includes transmitting or receiving reference symbols 18 of a reference signal 16 on respective radio resources 20, including first and second sets S1, S2 of radio resources 20 that differ in at least one radio resource 20 (Block 110). The first set S1 of radio resources includes a first pair of radio resources that are separated from one another in a radio resource domain by a first separation distance, with no reference symbol of the reference signal on any radio resource between the first pair of radio resources in the radio resource domain. The second set S2 of radio resources includes a second pair of radio resources that are separated from one another in the radio resource domain by a second separation distance, with no reference symbol of the reference signal on any radio resource between the second pair of radio resources in the radio resource domain. The second separation distance is at least twice as large as the first separation distance. The radio resource domain may be a time domain or a frequency domain.

In some embodiments, such as those where the method is performed by the receive radio node 14, the method 100 may further include performing time or frequency tracking or synchronization using the reference symbols 18 (Block 120). For example, in some embodiments, this comprises performing frequency offset estimation.

In other embodiments, such as those where the method is performed by the transmit radio node 12, the method 100 may further include configuring the receive radio node 14 to receive the reference signal 16 to perform frequency offset estimation. As part of such configuring, for instance, the method 100 as shown may include transmitting (or receiving from the perspective of the receive radio node 14) configuration information indicating a configuration with which the reference symbols 18 of the reference signal 16 are to be transmitted or received on the respective radio resources 20 (Block 105). This configuration information may for instance be transmitted or received as dynamic control signaling (e.g., in the form of downlink control information, DCI, at the beginning of a slot). Alternatively or additionally, the configuration information may be transmitted or received as higher-layer signaling (e.g., radio resource control, RRC, signaling) or as part of broadcast information.

A radio node herein is any type of node capable of communicating over radio signals. A radio network node herein is any type of network node (e.g., a base station) capable of communicating with another node over radio signals. A wireless device is any type device capable of communicating with a radio network node or another wireless device over radio signals. A wireless device may therefore refer to a machine-to-machine (M2M) device, a machine-type communications (MTC) device, a NB-IoT device, etc. A wireless device may also be referred to as a radio device, a radio communication device, a wireless terminal, or simply a terminal—unless the context indicates otherwise, the use of any of these terms is intended to include device-to-device devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. It should be understood that these devices may be user equipments, but are generally configured to transmit and/or receive data without direct human interaction.

In an IOT scenario, a wireless device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless device as described herein may be comprised in a vehicle and may perform monitoring and/or reporting of the vehicle's operational status or other functions associated with the vehicle.

The term separation distance refers to a distance separating radio resources on which reference symbols are transmitted or received. Separation distance may thus correspond to inter-symbol distance.

Note that a radio node (e.g., a transmit radio node 12 or receive radio node 14) as described above may perform the processing herein by implementing any functional means or units. In one embodiment, for example, the radio node comprises respective circuits configured to perform the steps shown in FIG. 3. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein.

Figure 4A:
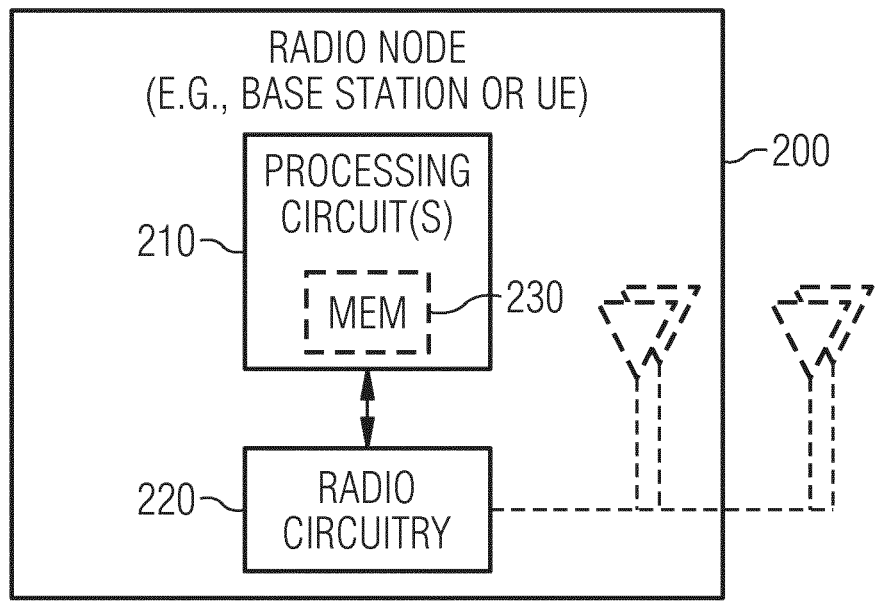
FIG. 4A is a block diagram of a radio node according to some embodiments.

FIG. 4A illustrates additional details of a radio node 200 in accordance with one or more embodiments. As shown, the radio node 200 includes one or more processing circuits 210 and radio circuitry 220. The radio circuitry 220 may be configured to transmit and/or receive via one or more antennas that are internal and/or external to the radio node 200. The one or more processing circuits 210 are configured to perform processing described above, e.g., in FIG. 3, such as by executing instructions stored in memory 230. The one or more processing circuits 210 in this regard may implement certain functional means or units.

Figure 4B:
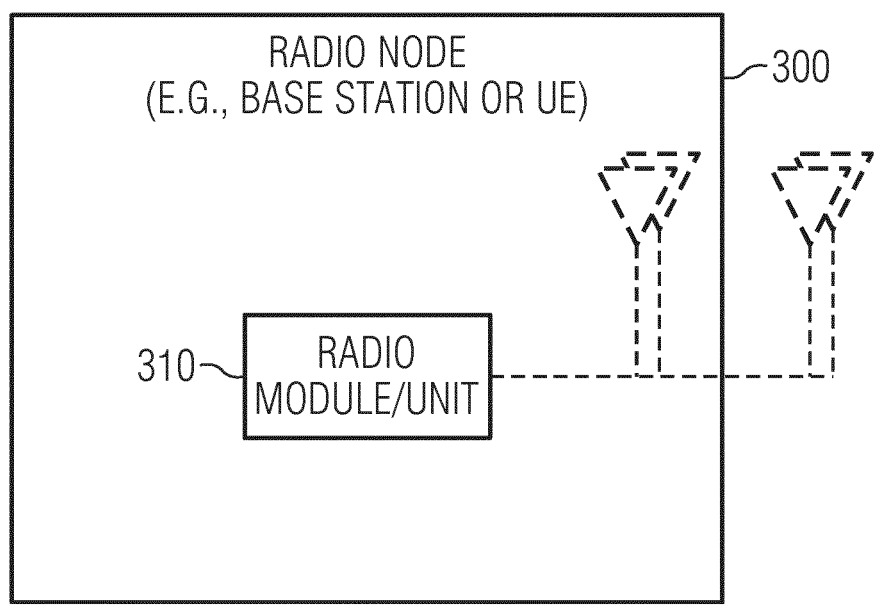
FIG. 4B is a block diagram of a radio node according to other embodiments.

FIG. 4B in this regard illustrates additional details of a radio node 300 in accordance with one or more other embodiments. Specifically, the radio node 3400 may include a radio module or unit 310 for performing the transmitting or receiving in FIG. 3. One or more of these modules or units may be implemented by the one or more processing circuits 210 in FIG. 4A.

Those skilled in the art will also appreciate that embodiments herein further include corresponding computer programs.

A computer program comprises instructions which, when executed on at least one processor of a radio node, cause the radio node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

Some embodiments will now be described in more detail in a context where the reference signal 16 may be configured for or usable in a 5G or New Radio (NR) wireless communication system. Despite explanation in the context of 5G in these and other embodiments, it will be appreciated that the techniques may be applied to other wireless networks. Thus, references herein to signals using terminology from the 3GPP standards should be understood to apply more generally to signals having similar characteristics and/or purposes, in other networks.

Currently a new 'fifth generation' radio access technology referred to as NR is being developed and specified in 3GPP. One important aspect of this technology is to avoid "always-on" signals, i.e. reference signals transmitted in every subframe, as far as possible. This is in order to avoid creating unnecessary interference, reduce energy consumption and also to make it easier in the future to introduce new technology modes unrestricted by the existence of always-on signals that need to be kept for backwards-compatibility reasons.

This is based on experience from the fourth-generation technology Long Term Evolution (LTE). In LTE, cell reference signals (CRS) are always transmitted (in every downlink subframe), irrespectively of whether the cell is serving any user with data and it has been seen to limit system performance in some scenarios. In LTE, the CRS is utilized for multiple purposes including measurements, frequency offset estimation and time synchronization as well as being used for demodulation of physical downlink channels. Even though the intention is to avoid specifying mandatory transmission of always-on signals like CRSs in NR, the critical functionalities of time synchronization and frequency offset estimation must be supported.

In NR, it's therefore crucial to design configurable reference signals that support these critical functionalities like frequency offset estimation and time synchronization in a way that balance the need for accuracy in frequency offset estimation and time synchronization versus reference signal overhead and overall system performance.

Due to oscillator imperfections, both on the transmitter and the receiver side, and because of Doppler shift of the signal, there is a need for the receiver to estimate the carrier frequency of the received signal. The estimated frequency is used to down convert the signal to baseband. An error in the estimate will result in a time-dependent phase in the equivalent base band signal:

$$b(t)=b_0(t) \cdot e^{-i \cdot 2\pi \cdot f_{err} \cdot t}$$

Here, $b_0(t)$ is the equivalent baseband signal resulting from down conversion with the true received frequency $f_c$ and $b(t)$ is the equivalent baseband signal resulting from down conversion with the estimated frequency $f_{est}=f_c+f_{err}$.

Figure 5:
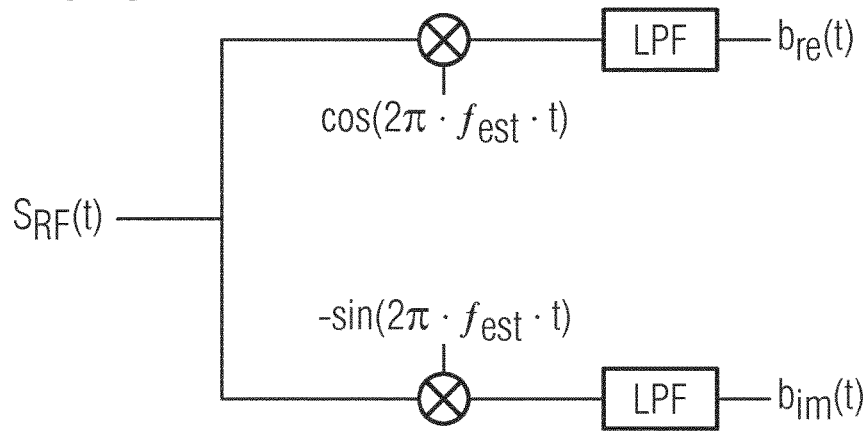
FIG. 5 is a block diagram of down conversion of a radio frequency signal into an equivalent baseband signal according to some embodiments.

FIG. 5 in this regard shows down conversion of an RF signal $s_{RF}(t)=I(t) \cdot \cos(2\pi \cdot f_c \cdot t)-Q(t) \cdot \sin(2\pi \cdot f_c \cdot t)$ into an equivalent baseband signal $b(t)=b_{re}(t)+i \cdot b_{im}(t)$. With a perfect frequency estimate $f_{est}=f_c$, the equivalent baseband signal $b(t)=b_0(t)\equiv I(t)+i \cdot Q(t)$. With an imperfect frequency estimate $f_{est}=f_c+f_{err}$, however the equivalent baseband signal $b(t)=b_0(t) \cdot e^{-i \cdot 2\pi \cdot f_{err} \cdot t}$.

In Orthogonal Frequency Division Multiplexing (OFDM), a discrete Fourier transform is performed (typically using a Fast Fourier Transform, FFT, algorithm) of the time-sampled baseband signal for each OFDM symbol. Here, the error in the frequency estimate will result in: (i) a phase difference between the OFDM symbols (a factor $e^{-i \cdot 2\pi \cdot f_{err} \cdot t_n + i \cdot \theta}$ where $t_n$ is the time of the start of the n'th OFDM symbol); and (ii) a mixing of the Fourier coefficients as compared with the Fourier coefficients resulting from down conversion with the true received frequency. This may be viewed as inter-subcarrier interference.

Frequency estimation may be performed based on estimating how fast the phase changes in the equivalent baseband signal resulting from down conversion with the current best estimate of the frequency. If the estimate is based on known reference signals with large separation in time, then the phase difference to estimate will be large and a larger phase in comparison to noise will improve accuracy. A large separation in time between consecutive reference signals increases the risk for aliasing however. Indeed, the instantaneous phase is only defined up to $2 \cdot \pi$ and thus the phase difference between two consecutive reference signals becomes ambiguous if $|f_{err}| \cdot \Delta t > \frac{1}{2}$, where $\Delta t$ is in seconds and where $|f_{err}|$ is the accuracy of the current frequency estimate in Hz (taking noise into account, phase ambiguity can occur also for $$\Delta t < \frac{1}{2 \cdot |f_{err}|}$$

but me probability is smaller for small $\Delta t$). Here, the ambiguity or aliasing inducing separation distance may be equal to $$\frac{1}{2|f_{err}|}.$$

To achieve a large separation in time and at the same time avoiding aliasing, the reference signal used for frequency estimation according to some embodiments herein is transmitted repeatedly over a long time span with a time difference between consecutive signals that is smaller than $$\frac{1}{2 \cdot |f_{err}|}.$$

A UE in NR may get a first rough frequency estimate based on a synchronization block sent with a certain frequency, say every 20 ms or 40 ms. This will give a frequency estimate with an accuracy of say 5% of the subcarrier spacing (the design of the synchronization block is not yet settled and UE requirements are not set). This is far from sufficient for high performance reception and additional reference signals are needed for frequency estimation. In NR this reference signal will most likely be used for multiple purposes such as e.g. time tracking, delay spread estimation and Doppler spread estimation.

Introducing a downlink reference signal for time and/or frequency tracking is necessary but introduces overhead as these resources must be taken from resources used for data transmission. It also creates interference to other cells which degrades system performance. It is thus a problem how to balance resource overhead with demodulation and system performance.

According to embodiments herein, an irregular, or variable, temporal pattern is used for the transmission and reception of reference signals that are used for frequency estimation. The temporal pattern is such that there is a subset (call it G) of reference signals that are transmitted spaced closely in time (e.g. closely spaced OFDM symbols) while in general these reference signals are transmitted more sparsely spaced in time.

More specifically, the maximum time between consecutive signals in the subset G of reference signals should be such that aliasing is unlikely to occur based on the initial frequency estimate. The maximum time between consecutive signals in the set of all reference signals on the other hand can be allowed to be so large that aliasing is likely to occur based on the initial frequency estimate but should be small enough for aliasing to be avoidable with the help of a frequency estimate based on the subset G of reference signals.

On the receiver side, the frequency is estimated in two steps according to some embodiments. First, the frequency is estimated based on the subset G of the reference signals. Next, the frequency is estimated based on the full set of reference signals making use of the frequency estimate in the first step to avoid aliasing.

Some embodiments therefore include a tracking reference signal (TRS) burst pattern consisting of a sub-pattern that is dense in time and thus robust towards aliasing given an initial frequency estimate.

In one embodiment, a method in a wireless communication network comprises transmitting reference signals to perform frequency offset estimation, where the reference signals are transmitted in bursts and where a burst contains a set S of reference signal symbols and is further divided into a subset G of the set S of reference signal symbols, having a maximum symbol spacing smaller than the maximum symbol spacing of the set S.

In another embodiment, a method in a wireless terminal comprises receiving (measuring on) reference signals to perform frequency offset estimation, where the reference signals are received in bursts and where a burst contains a set S of reference signal symbols and is further divided into a subset G of the set S of reference signal symbols, having a maximum symbol spacing smaller than the maximum symbol spacing of the set S. The wireless terminal may be configured in this way by default, or by radio resource control (RRC), or by RRC in combination with downlink control information (DCI).

In yet another embodiment, a method in a wireless terminal comprises resolving phase ambiguity using the subset of G reference signal symbols, where the maximum symbol spacing of the subset G is smaller than the maximum reference signal symbol spacing of the set S.

Figure 6:
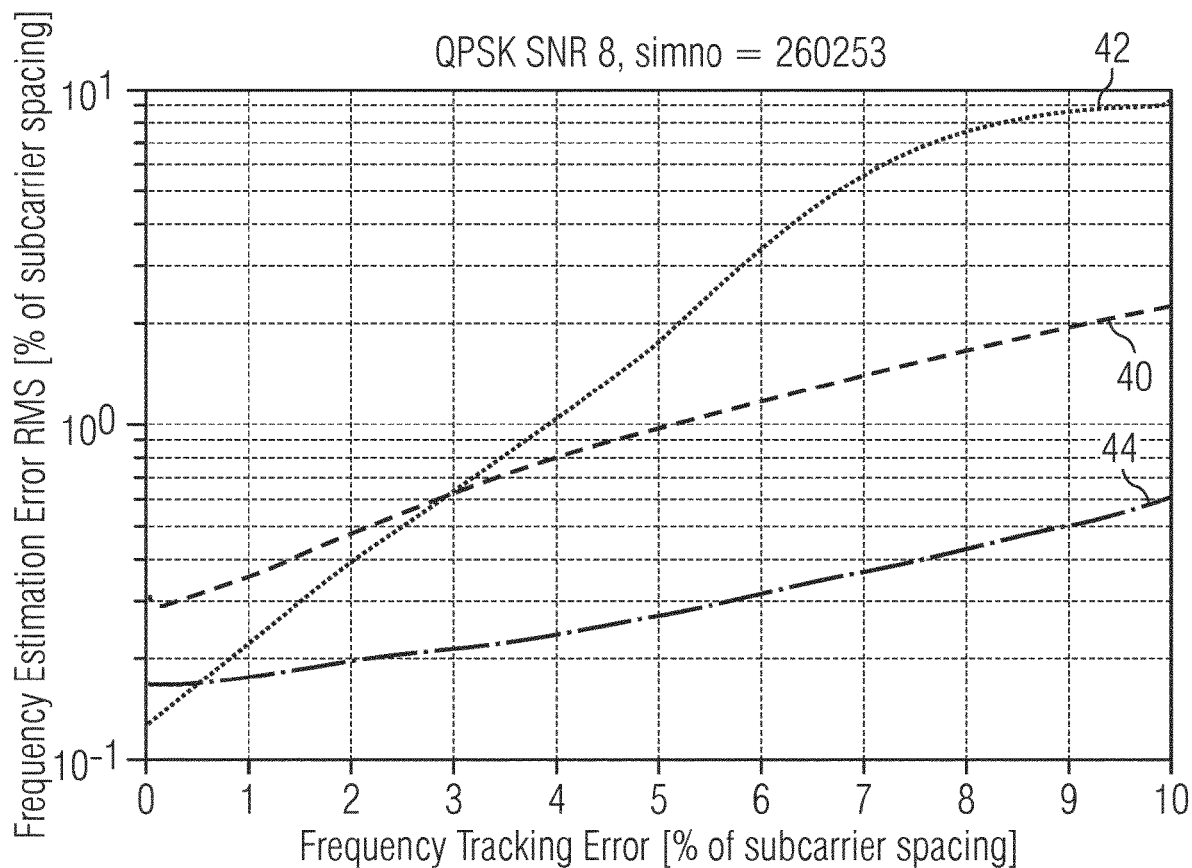
FIG. 6 is a graph of frequency offset estimation error according to some embodiments.
Figure 7:
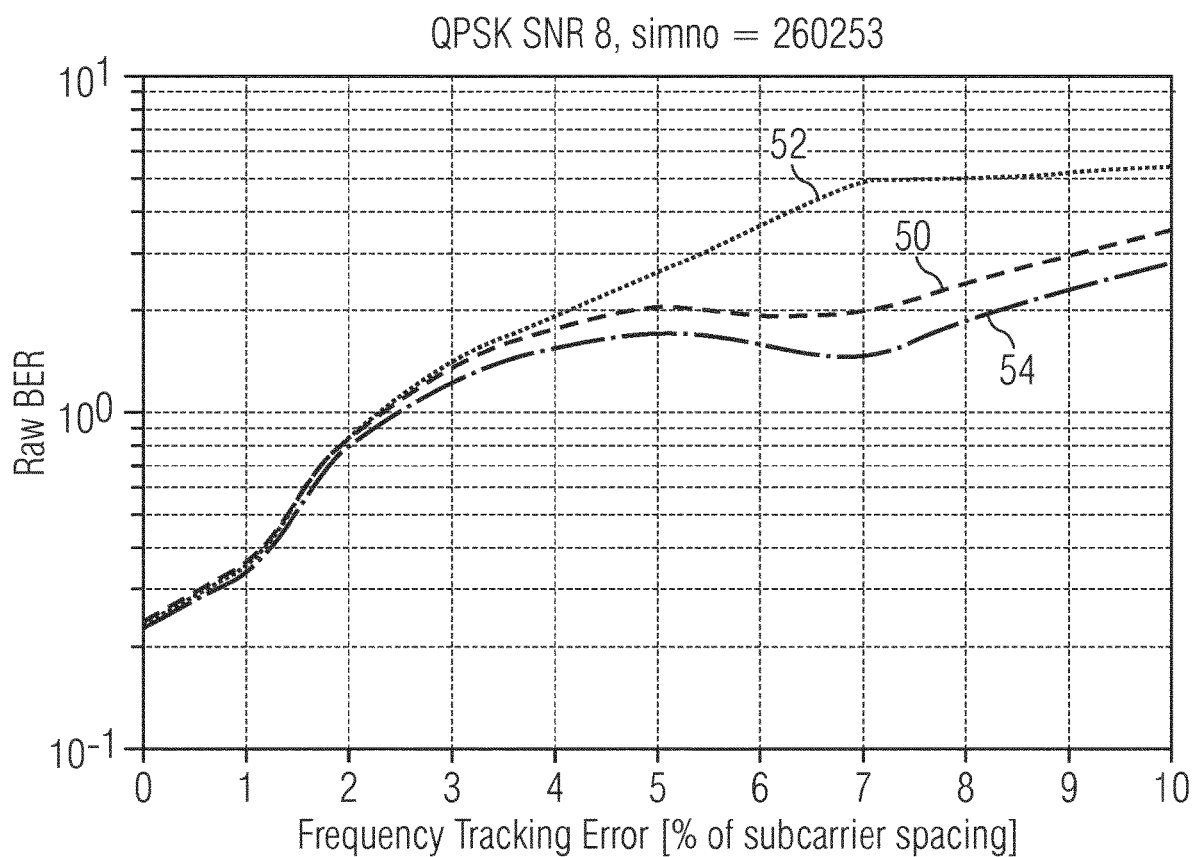
FIG. 7 is a graph of raw bit error rate according to some embodiments.

Some embodiments give a better frequency estimation accuracy for a given reference signal overhead than currently used methods or alternatively the same frequency estimation accuracy as currently used methods but with a lower reference signal overhead. This can be seen in FIGS. 6 and 7. FIG. 6 in this regard shows frequency offset estimation error RMS as a function of the frequency offset. This is shown as line 40 for one step estimation based on TRS in symbol 3, 5, 7 and 9, line 42 for one step estimation based on TRS in symbol 3, 5, 7 and 14, and line 44 for two step estimation based on TRS in symbol 3, 5, 7 and 14 using symbol 3, 5, and 7 in the first-step estimation and symbol 3, 5, 7 and 14 in the second-step estimation. FIG. 7 shows raw bit error rate (BER) as a function of the initial frequency offset after re-tuning the receiver oscillator based on the frequency estimation. Line 50 shows raw BER for one step frequency estimation based on TRS in symbol 3, 5, 7 and 9. Line 52 shows raw BER for one step frequency estimation based on TRS in symbol 3, 5, 7 and 14. And line 54 shows raw BER for two step frequency estimation based on TRS in symbol 3, 5, 7 and 14 using symbol 3, 5, and 7 in the first step estimation and symbol 3, 5, 7 and 14 in the second step estimation.

In more detail, denote the reference signal used for frequency estimation by Tracking Reference Signal (TRS). The TRS is defined as a burst of S OFDM symbols with a certain symbol spacing between OFDM symbols having TRS. Each TRS burst has a total time extent of T OFDM symbols and may span one or multiple slots.

In the case of an OFDM based system a subset of the subcarriers is used for the TRS resource elements (RE) in each symbol used to carry the TRS. One example of mapping in the frequency domain is when the subcarriers used for TRS in an OFDM symbol are equally spaced across the transmission bandwidth, also known as a comb-based structure. Also, the transmission bandwidth of the TRS may be smaller than the system bandwidth. For example, the TRS in some embodiments spans only 10 MHz while the system bandwidth is 80 MHz.

Moreover, the TRS burst can be configured to be sent periodically with some periodicity, for example starting every Y:th slot. Each TRS burst has a length of X slots. In each TRS burst, a set S of OFDM symbols are used to carry the TRS, denoted as the S "TRS symbols" below.

Figure 8:
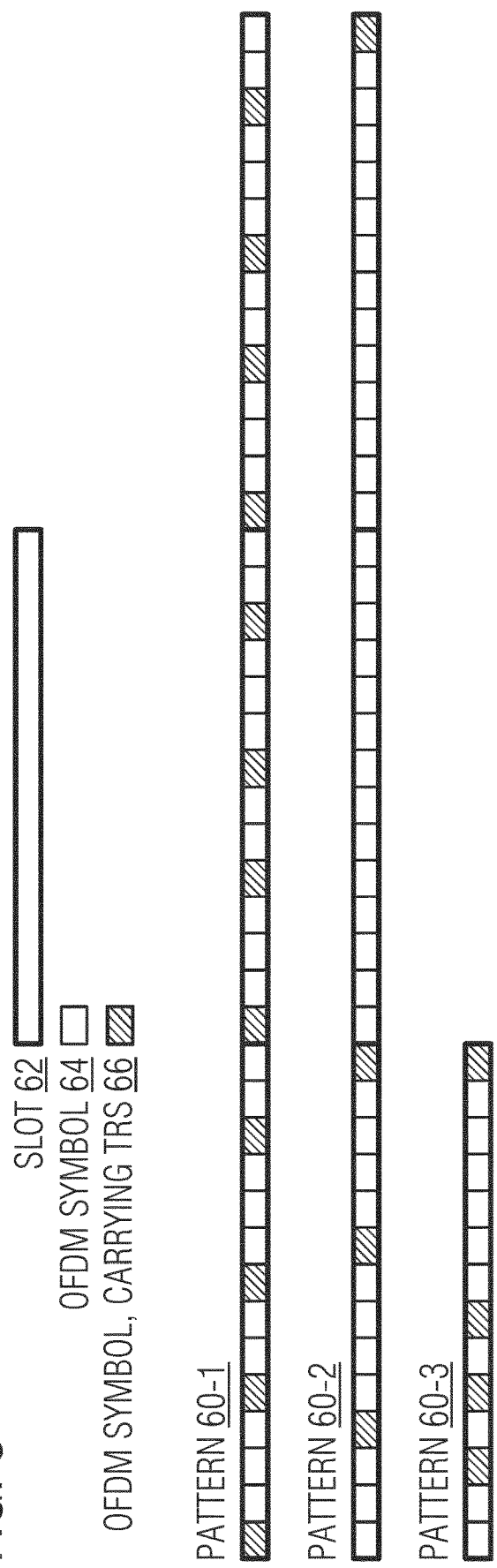
FIG. 8 is a block diagram of different possible patterns for the mapping of a reference signal onto OFDM symbols according to some embodiments.

As an example, consider a slot with 14 OFDM symbols in which the TRS is mapped to S=12 OFDM symbols over X=3 slots. FIG. 8 shows one such pattern 60-1 for the mapping of a TRS burst onto OFDM symbols. As shown, according to pattern 60-1, OFDM symbols 66 carrying the TRS include symbols 1, 5, 8, and 12 of each of the three slots 62 in the TRS burst. The other OFDM symbols in three slots are OFDM symbols 64 that do not carry TRS. Hence, 12 out of 3·14=42 OFDM symbols carry the TRS. The remaining 42−12=30 OFDM symbols carry other transmissions such as physical downlink channels and other signals e.g. physical downlink control channel (PDCCH), physical downlink shared channel (PDSCH), channel state information reference signal (CSI-RS), etc. It is also possible that these "other transmissions" are mapped to the same OFDM symbols as the TRS symbols but to other resource elements.

Some embodiments introduce a time-variable TRS density in order to reduce the overhead and unnecessary interference. Some embodiments focus on time density and related frequency offset estimation, but the same principle holds for frequency density and time synchronization.

In one embodiment, the variable time density occurs within a TRS burst. For example, the TRS symbol density is higher in one part (e.g. the beginning) of the TRS burst but sparser in another part (e.g. the end) of the TRS burst. More specifically, the TRS burst is constructed so that there is a subset G of the set S of TRS symbols that are used to carry the TRS for which the maximum time between consecutive TRS symbols is significantly smaller than the maximum time between consecutive TRS symbols in the full set S.

The time density can also be controlled on a slot basis, in case a TRS burst uses multiple adjacent slots. In one example, the first slot in the TRS burst has high TRS density, e.g. with OFDM symbol spacing 2 between consecutive TRS symbols, while the following slots in the TRS burst have lower TRS density, e.g. with OFDM symbol spacing 4 between consecutive TRS symbols. Hence, the UE can make accurate frequency offset estimation based on the first slot in the TRS burst and then make further adjustments on the TRS symbols in the remaining slots in the TRS burst. The benefit of this approach is that each slot has a single TRS symbol time density and density changes at the slot boundary only, which simplifies PDSCH to resource element (RE) mapping.

FIG. 8 shows a more concrete example in the form of a pattern 60-2. As shown for pattern 60-2, a TRS burst is mapped on S=4 OFDM symbols within X=3 slots with 14 OFDM symbols each. In particular, symbol numbers 4, 9, 14 and 32 carry the TRS burst. The full set S has a maximum time between consecutive TRS symbols equal to 28 symbol times (32−4), while the subset consisting of symbols 4, 9 and 14 has a smaller maximum time between consecutive TRS symbols equal to five symbol times (14−9=9−4).

FIG. 8 shows yet another example in the form of a pattern 60-3. As shown for pattern 60-3, a TRS burst is mapped on S=4 OFDM symbols within X=1 slots with 14 OFDM symbols. In particular, symbol numbers 3, 5, 7 and 14 carry the TRS burst. The full set S has a maximum time between consecutive TRS symbols equal to 7 symbol times (14−7), while the subset consisting of symbols 3, 5 and 7 has a smaller maximum time between consecutive TRS symbols equal to two symbol times (7−5=5−3).

In another embodiment, the variable time density occurs between TRS bursts. Hence, some TRS bursts have higher time density between TRS symbols in the TRS burst than other TRS bursts. For example, the periodicity of TRS bursts is Y slots and every N:th burst has high time density (OFDM symbols carrying TRS symbol is dense) while the in-between N−1 bursts have low time density (including the case that this low density TRS burst only has a single OFDM symbol containing TRS symbol, to allow for mainly time synchronization). The TRS bursts transmitted in-between may thus have different time durations with respect to every N:th TRS burst.

A TRS configuration, comprising the TRS burst parameters and its periodicity (Y), may be fixed in standard (e.g., 3GPP) specifications or configured using higher layer signaling such as RRC signaling. A UE may also have multiple, different TRS's configured for different purposes. For example, the UE may have one default TRS burst, given by specification, that gives the frequency offset estimate accuracy (and time synchronization) sufficient to demodulate system information and to perform RRC configuration. The UE may also have a second TRS burst, which is UE specifically configured by RRC, to obtain a more accurate time frequency tracking performance necessary for higher order modulation (e.g. 256 QAM) and multiple input multiple output (MIMO). Note that the UE still needs to know the presence of the default TRS even though the second TRS is configured, in order to know which REs are available for PDSCH and which are occupied by a TRS transmission.

In another embodiment, the presence of TRS symbols in a slot and/or the TRS density is dynamically signaled by downlink control information (DCI) in a control channel in a slot, which may be a broadcast control channel message, such as the group common PDCCH (GC-PDCCH) in the beginning of the slot. Hence, a UE can decode this control channel and will then know whether TRS is present or not in the slot. Another use case of the dynamic signaling is to indicate whether the TRS burst has full density (e.g. regular time density/equal spacing across the whole TRS burst) or reduced density (e.g. according to embodiments described above with irregular density across the TRS burst to reduce overhead). The dynamic signaling allows the network to use the full density in case no UE is scheduled (no PDSCH transmission) as this will not cause any overhead or use the reduced density in case of a UE is scheduled in resources that overlaps with (parts of) the TRS burst.

The benefit of dynamic signaling in a broadcast message is that even if a UE is not scheduled in that slot (by a regular PDCCH containing scheduling assignment), the UE can by decoding this control channel (e.g. GC-PDCCH), use the TRS with the correct density to perform frequency offset estimation. In yet another embodiment related to the previous, a slot contains multiple configured TRS's mapped to orthogonal resources (resource elements). One use case of multiple TRS is a default TRS and one UE specifically configured TRS as discussed earlier, or another use case is transmission from multiple transmission points or multiple antenna panels which may not have the same local oscillator reference, hence one TRS is needed for each such reference. In this case, the control channel such as GC-PDCCH contains an indication (such as an index of set of indices) of which TRS burst or TRS bursts is/are present in the slot and/or which TRS density is used (full or reduced).

In another embodiment, the burst configuration of the TRS depends on whether the UE is in active-mode or in discontinuous reception (DRX) DRX mode. In long DRX cycles, where the UE occasionally wakes up to read PDCCH, the UE can be scheduled with a TRS burst configuration that can both handle relatively large frequency errors and provide accurate estimates. When starting a new transmission, or restarting an old transmission after a long period of silence, it is difficult to make any pre-assumptions about the frequency error. Then it is beneficial in some embodiments to have a second temporary default configuration that is always used when starting a new transmission, or restarting after a certain period of silence. This configuration must thus be able to handle both large frequency errors and good accuracy. Then after a specified time, when synchronization typically is established, this second temporary default configuration is terminated.

Consider now additional discussion on time and frequency tracking. Fine/time frequency tracking RS (TRS) structure may include a burst structure and a TRS structure inside a burst. The RS(s) used for tracking can be the existing (i.e., legacy) ones, revision of the existing ones, or new ones. The parameters for the burst structure may be at least: X (the length of TRS burst in terms of the number of slots) and Y (the TRS burst periodicity in terms of number of slots). The TRS supports at least a single slot. In some embodiments, TRS at least supports an equal RE spacing in the frequency domain within a TRS bandwidth. Note that more than one equal RE spacing can be considered. The parameters for TRS structure inside a burst may be at least: $S_f$: TRS subcarrier spacing, $S_t$: TRS symbol spacing within a slot, N: Number of OFDM symbols per TRS within a slot, B: TRS bandwidth in terms of number of RBs. The different slots in a TRS burst may have different TRS parameters (N, B, $S_f$, $S_t$). TRS may have a repetition or staggered structure in time domain within a slot. Symbol spacing may be equal or non-equal within a slot.

Consider now some performance evaluation for different TRS configurations including both time and frequency synchronization. Furthermore, basic properties of the TRA and some aspects for how to configure the TRS are discussed.

First, consider TRS overhead analysis, as well as interference and energy efficiency. In LTE the overhead and interference from the CRS has been seen to impact energy consumption as well as performance negatively. In NR, the TRS will be used for similar purposes as the CRS in LTE and it's critical that the TRS design avoids the problems seen in LTE. The TRS overhead per PDSCH can be calculated as $$OH_{TRS} = \frac{N}{14\,S_f Y} \cdot \frac{B}{B_{PDSCH}}$$

Large periodicity of the TRS bursts (Y) can be used to efficiently reduce the overhead. For example, if Y=20 then $$OH_{TRS} = 0.36\% \cdot \frac{B}{B_{PDSCH}} \cdot \frac{N}{S_f}.$$

For comparison, the overhead of the antenna port 0 CRS in LTE is $\frac{1}{21} \cong 5\%$. The interference generated by the TRS is proportional to the overhead assuming fixed power per subcarrier.

For energy efficiency, it is desired to allow for gNB DTX and thus to minimize the proportion of symbols utilized to transmit the TRS. The proportion of symbols utilized to transmit one TRS is N/Y (for comparison, the proportion of symbols utilized to transmit the antenna port 0 CRS in LTE is 2/7). With multiple TRSs the proportion of symbols utilized to transmit the TRSs can be reduced if Frequency Division Multiplexing (FDM) of TRSs is utilized. Energy can also be saved by enabling UEs to share TRSs whenever possible.

For gNB energy efficiency it could be beneficial to frequency multiplex TRS and SSblock, or co-locate then to be adjacent in time to further increase gNB DTX and UE DTX. In cases with no SSblock transmitted from a transmission point, it could be especially beneficial to have even larger TRS burst periodicity (Y) to achieve larger than 20 ms DTX.

Accordingly, large TRS burst periodicity (Y) is an enabler for low TRS overhead, large gNB DTX periods and good gNB energy efficiency. The TSR burst periodicity configuration should allow for at least 20, 40, and 80 ms DTX gNB period. The configuration of TSR should allow frequency multiplexing with SSblock.

The TRS is primarily envisioned to be used for synchronizing the oscillator of the UE and to adjust the FFT window placement prior to demodulation. Other use cases have also been identified such as Doppler spread estimation and delay spread estimation. In this evaluation exercise, time estimation and frequency estimation, based on TRS, is done in parallel and corrections are applied before channel estimation and demodulation of the PDSCH. Channel estimation for demodulation is based on demodulation reference signal (DMRS) only (in the channel estimator are used delay estimates using only DMRS, for determining the delay spread of the channel).

The channel model used in this analysis was TDL-A 300 ns with Doppler (Jakes) and AWGN, unless anything else is stated. Link adaptation is used to adjust coding rate and modulation {QPSK, 16QAM, 64QAM, and 256QAM}.

Figures 9, 10:
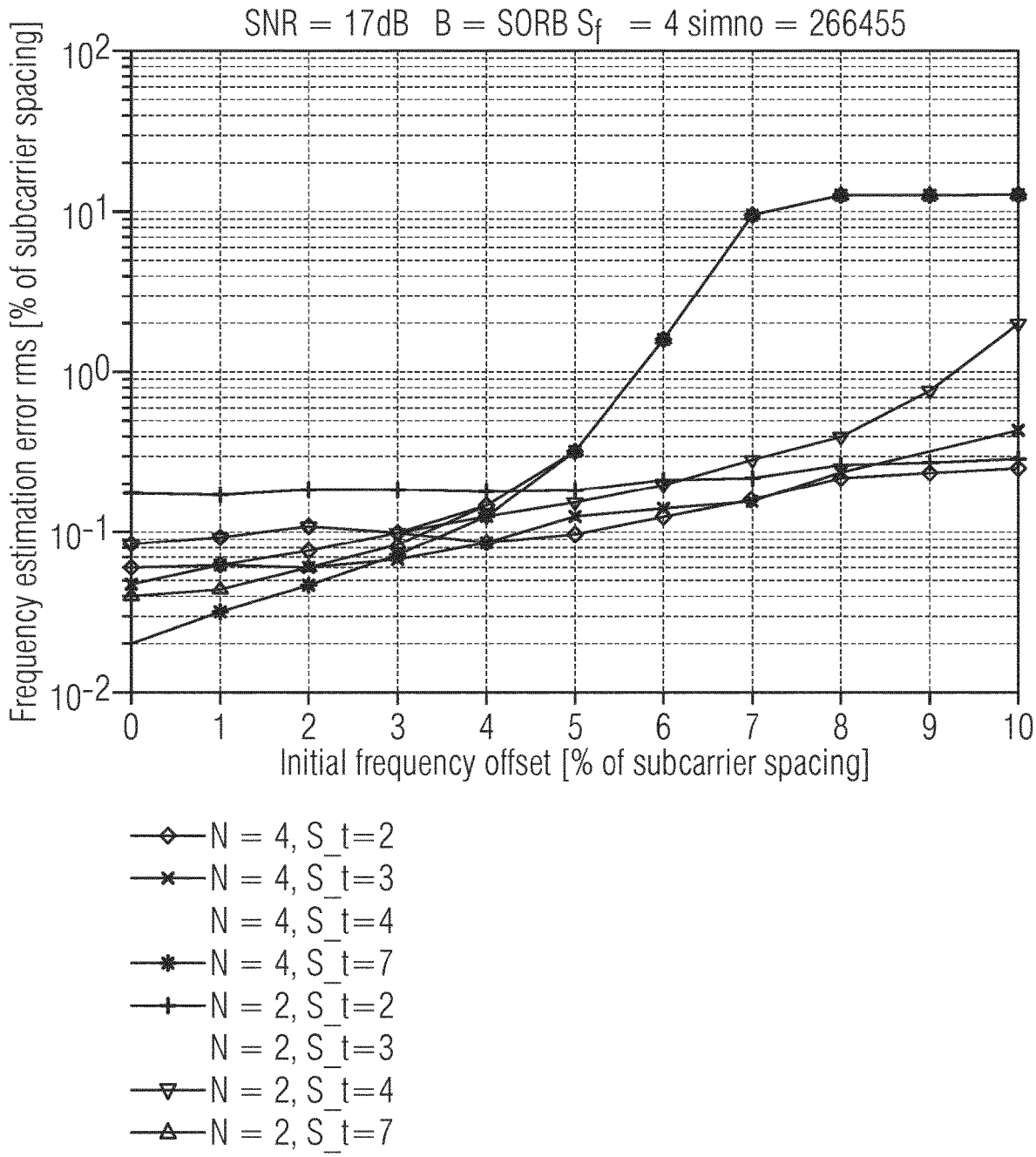
FIG. 9 is a table of throughput loss for different signal-to-noise ratios (SNRs) according to some embodiments.
FIG. 10 is a graph of frequency estimation error according to some embodiments.

Consider first the Sensitivity of throughput to a frequency offset. An offset in the frequency used for down conversion in the UE impacts the performance through inter subcarrier interference and also by impacting interpolation and filtering in channel estimation. Based on analysis, the frequency offset should not be larger than ~0.25% of the subcarrier spacing in order to keep the loss in throughput relative to a zero-frequency offset below a couple of percent for low to medium SNR (See Table 1 in FIG. 9, showing throughput loss at a frequency offset of 37.5 Hz or 0/25% of the sub-carrier spacing). For large SNRs the sensitivity to frequency offsets is larger and the frequency offset should not be larger than ~0.025% of the subcarrier spacing in order to keep the loss in throughput relative to a zero offset below a couple of percent. Indeed, for high SNRs there is a significant reduction in throughput even for a frequency offset as small as 37.5 Hz or 0.25% of the subcarrier spacing.

Consider TRS performance with small initial synchronization errors. In particular, consider the impact of UE RX FFT window placement after time synchronization with no frequency error, with and without frequency synchronization. Performance is measured in terms of link throughput and rms of the residual time synchronization error, and rms of the residual frequency synchronization error. For N=2 and $S_f$=4 symbol 5 and 9 are used for TRS. For N=4 and $S_f$=4 symbol 5, 11, 15, and 19 are used for TRS. The burst periodicity Y=20 slots. No averaging over multiple TRS bursts are used.

Consider first time synchronization with small timing error and perfect frequency synchronization. The performance of the fine time estimator may be evaluated assuming a small delay error of 10 samples with no frequency error (this is an artificial scenario and it is only useful for the analyse to isolate the performance of the fine time synchronization). With ideal frequency synchronization and fine time synchronization based on TRS, the PDSCH performance is not very sensitive to the TRS subcarrier spacing ($S_f$), the number of TSR symbols in the TRS burst (N), nor the TRS bandwidth (B). Some small improvements can be found for low SNR by increasing N, B and $S_f$. The reason is that window placement is very robust against small errors. Also, due to large TRS periodicity Y=20, the relative TRS overhead is quite similar for the evaluated TRS settings. Scenarios with larger delay spread could potentially be more challenging. Further improvement of performance can be obtained by improving synch algorithms and by averaging over multiple TRS bursts.

Accordingly, the impact of fine time synchronization on PDSCH performance is not very sensitive to the TRS subcarrier spacing ($S_f$), nor the number of TSR symbols in the TRS burst (N>1). N=2 is good enough for fine time synchronization. The fine time synchronization performance is almost as good as genie aided window placement and delay spread estimation. Less than 1 dB difference can be observed in the −10 dB-0 dB SNR region. As long as PDSCH BW>4 RBs, the TRS bandwidth (B) can be much smaller than PDSCH BW without any noticeable performance degradation in fine time synchronization. With large TRS periodicity (Y=20) and small number of TRS symbols (N=2,4) and TRS bandwidth (B)<PDSCH bandwidth, the TRS over-head can be neglected in many cases.

Consider next time and frequency synchronization with small time and frequency errors. The performance of the fine time estimator may be evaluated assuming as small delay error ({0, ±10, ±50} samples @ 30.7 MHz) with a small frequency error (0 Hz) (this is a scenario that is very useful to illustrate the UE synchronization behaviour in steady state when initial large synchronization errors have been removed). When having a small frequency error (0 Hz) and non-ideal frequency estimation based on TRS and frequency error compensation, the PDSCH performance is still quite robust and changing TRS subcarrier spacing ($S_f$), the number of TSR symbols in the TRS burst (N), and the TRS bandwidth (B) does not change performance significantly.

As an example, a TRS pattern with N=4, B=12 RB, $S_f$=4 give a frequency estimation error rms of about 0.25% of the subcarrier spacing at an SNR of −15 dB and a frequency estimation error rms of about 0.025% at an SNR of 24 dB. As can be expected from the discussion, the throughput is then close to the throughput based on ideal time and frequency synchronization. Scenarios with larger delay spread and or high Doppler spread could potentially be more challenging. Further improvement of performance can be obtained by improving synch algorithms and by averaging over multiple TRS bursts.

Accordingly, the residual rms frequency error after frequency synchronization using TRS for small initial time and frequency errors is well below 200 Hz for all tested parameters. Thus, for the channel assumptions considered in this evaluation it is feasible to fulfil the expected requirements of 0.01 ppm at 2 GHz. The PDSCH performance is quite robust towards variations in the TRS subcarrier spacing ($S_f$), the number of TSR symbols in the TRS burst (N), and the TRS bandwidth (B). A TRS pattern with N=4, B=12 RB, $S_f$=4 give a performance which is almost as good as genie aided window placement and delay spread estimation. Less than 1 dB difference can be observed in the −10 dB-0 dB SNR region. The PDSCH performance is not very sensitive to time and frequency synchronization using the TRS for small time and frequency errors. E.g. a TRS with N=4, B=12 RB, and $S_f$=4 give a performance which is almost as good as genie aided window placement and delay spread estimation. Less than 1 dB difference can be observed in the −10 dB-0 dB SNR region. The residual frequency error after frequency synchronization using TRS for small time and frequency errors is well below 200 Hz.

Figure 11:
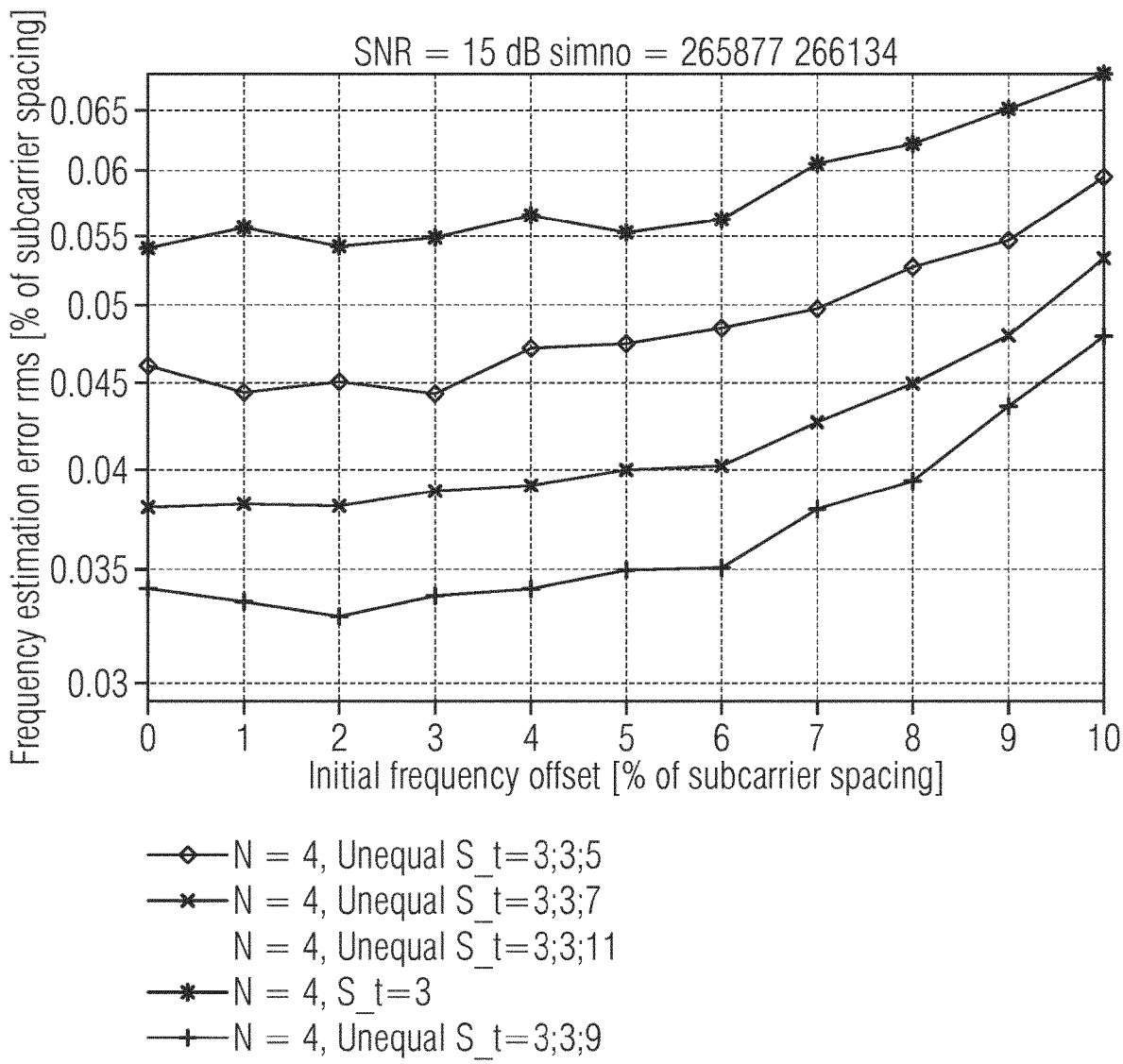
FIG. 11 is a graph of frequency estimation error according to other embodiments.
Figure 12:
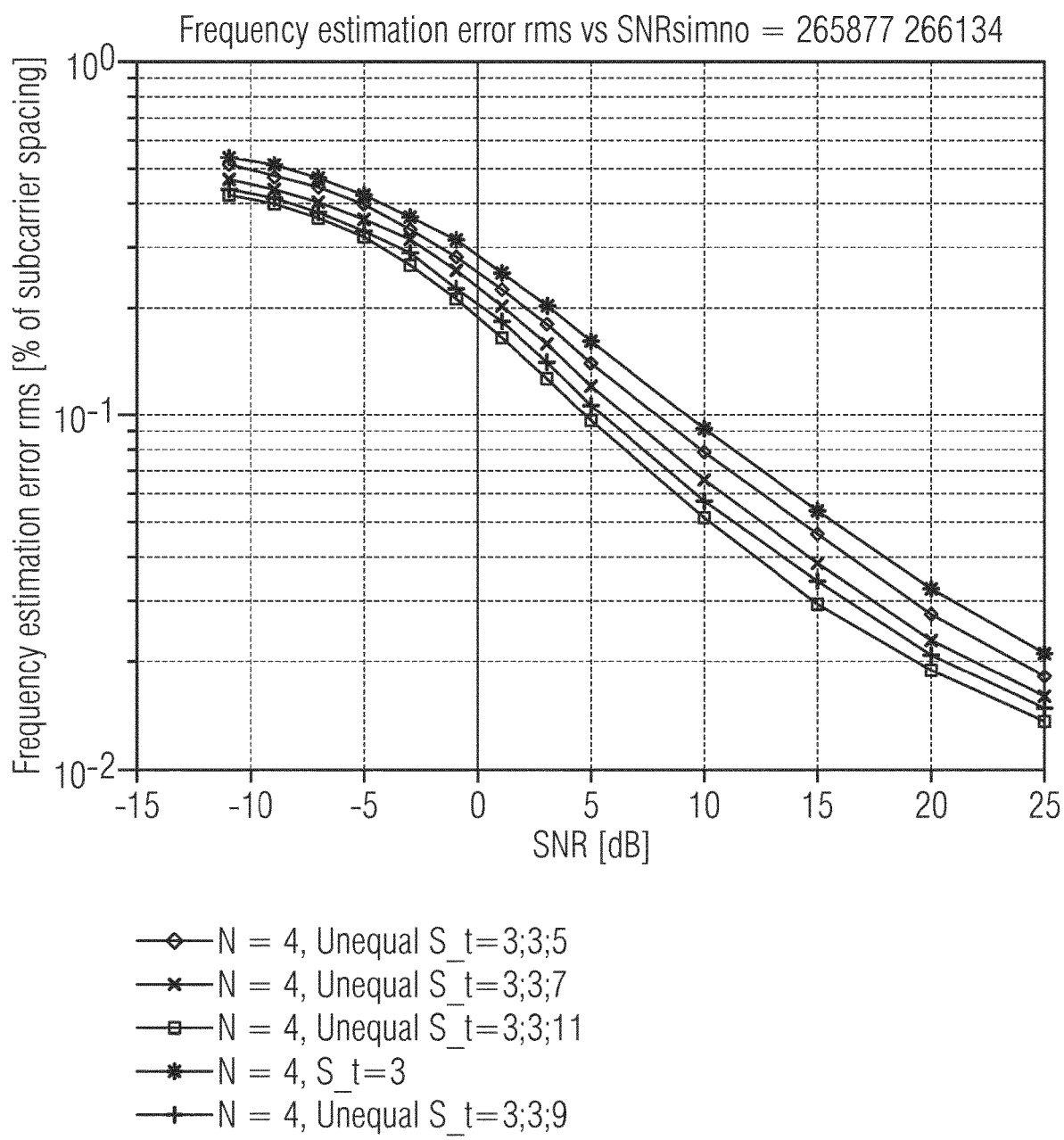
FIG. 12 is a graph of frequency estimation error according to still other embodiments.

Consider now TRS performance with large initial frequency error. At large initial frequency offsets, aliasing destroys the frequency estimate if the inter symbol distance $S_t$ between TRS symbols is too large. For large SNRs the patterns with $S_t$=7 frequency estimation breaks down at a frequency offset around 6% of the subcarrier spacing as can be seen in FIG. 10 (for all curves, $S_f$=4, B=$B_{PDSCH}$=50 RB and SNR=17 dB). On the other hand, the accuracy of the frequency estimation improves if the TRS symbols are spread over a long period in time. In order to spread TRS symbols over a long period in time without creating a large TRS overhead and still avoiding aliasing a pattern consisting of a number of symbols with a short inter symbol spacing $S_t$ can be followed by a symbol with large inter symbol spacing. As can be seen in FIG. 11 and FIG. 12, this gives an improved frequency estimation accuracy while avoiding problems with aliasing at least at large SNRs. FIG. 11 in particular shows frequency estimation accuracy based on TRS patterns with unequal TRS inter symbol spacing $S_t$. For all curves $S_f$=4, B=$B_{PDSCH}$=50 RB and SNR=15 dB. And FIG. 12 in particular shows frequency estimation accuracy at zero initial frequency offset for TRS patterns with unequal TRS inter symbol spacing $S_t$. For all curves $S_f$=4 and B=$B_{PDSCH}$=50 RB.

Figure 13:
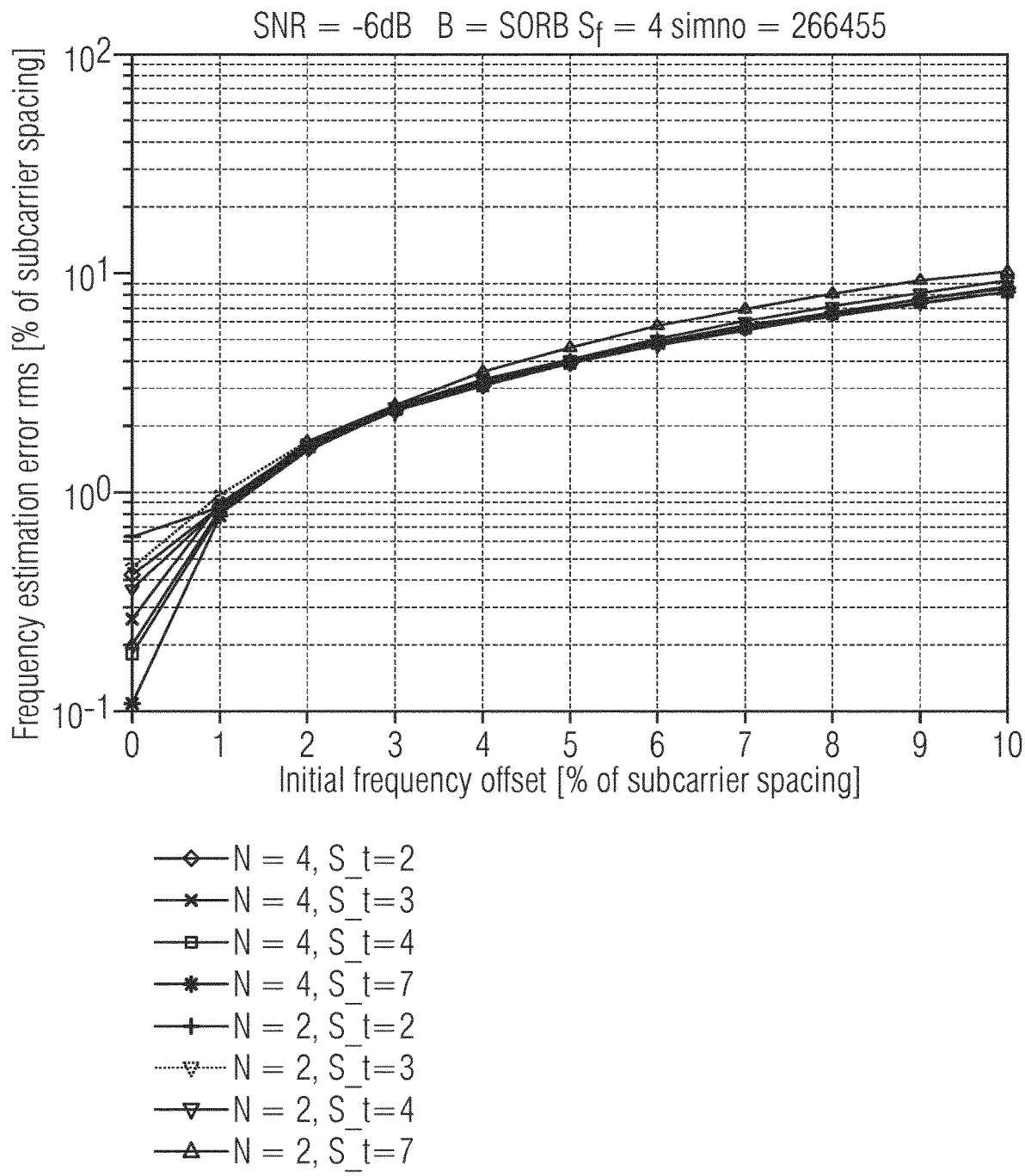
FIG. 13 is a graph of frequency estimation error according to yet other embodiments.

At low SNRs, the impact of frequency offsets sets in at quite early and have a big impact also on frequency estimation based on patterns with short TRS inter symbol distance $S_t$ as can be seen in FIG. 13. This is, however, based on a very simple frequency estimator and it can be expected that large improvements can be made e.g. through iteratively improved estimations. Further studies are needed to ensure good frequency estimation performance at low SNRs.

Accordingly, a pattern consisting of a number of symbols with a short inter symbol spacing ($S_t$) followed by a symbol with large inter symbol spacing gives an improved frequency estimation accuracy compared to a pattern with the same number of symbols and constant (short) inter symbol spacing while avoiding problems with aliasing.

Consider now TRS and multi-point transmission. Interference on, and from, TRSs in the case of multi-layer transmission and/or multi-point transmission must be considered when designing the TRS format and deciding on how to configure the TRS. There are different approaches that could be considered for combating TRS interference (1) Use orthogonal TRS for different layers/transmission points; (2) Use zero power TRS to avoid transmitting on resources used to transmit TRS on other layers, and/or layers transmitted from other transmission points; and (3) Use scrambled sequences over frequency to randomize TRS interference (this should also help to reduce PAPR, especially in cases with low $S_f$).

Accordingly, the RSs used for time and frequency tracking should support multi-point transmission. Frequency shifted frequency combs should be considered to support multi-point transmission. Zero power TRS should be supported to avoid data transmission on TRS resources in case of multi-layer transmission. Scrambling of TRS Comb in frequency should be supported to randomize interference. Scrambling of TRS Comb in frequency should be considered to minimize PAPR impact. The specification supports more than one possible TRS configurations as to cope with different deployments with different degrees of TRP synchronization. At least one TRS configuration is confined within a single slot.

A number of configuration related properties are desired for tracking RS. To ensure that QCL properties between the tracking RS and PDSCH allow fine tracking of time, delay spread, frequency and Doppler spread with user specific beam forming the TRS configuration should be UE specific. To save overhead it is advantageous to configure multiple UEs with the same tracking RS. In order to protect the tracking RS from interference from data transmissions, it should be considered to allow for allocate zero power tracking RSs. In order to support synchronization of connected users that are not receiving data and to save overhead, semi persistent configuration of a periodic tracking RS should be considered.

Accordingly, semi-persistent configuration of the TRS should be possible. The TRS configuration should be UE specific.

In view of the above, embodiments herein include those enumerated below.

Embodiment 1

A method performed by a radio node configured for use in a wireless communication system, the method comprising transmitting or receiving reference symbols of a reference signal on respective radio resources, including first and second sets of radio resources that differ in at least one radio resource, wherein the first set of radio resources includes a first pair of radio resources that are separated from one another in a radio resource domain by a first separation distance, with no reference symbol of the reference signal on any radio resource between the first pair of radio resources in the radio resource domain, and wherein the second set of radio resources includes a second pair of radio resources that are separated from one another in the radio resource domain by a second separation distance, with no reference symbol of the reference signal on any radio resource between the second pair of radio resources in the radio resource domain, wherein the second separation distance is at least twice as large as the first separation distance, wherein the radio resource domain is a time domain or a frequency domain.

Embodiment 2

The method of embodiment 1, wherein transmitting or receiving the reference symbols comprises receiving the reference symbols, and wherein the method further comprises performing frequency offset estimation based on the received reference symbols.

Embodiment 3

The method of any of embodiments 1-2, wherein at least one radio resource included in the first set is also included in the second set.

Embodiment 4

The method of any of embodiments 1-3, wherein the first set of radio resources is a subset of the second set of radio resources.

Embodiment 5

The method of any of embodiments 1-4, wherein the first set includes one or more pairs of radio resources that are each separated from one another in the radio resource domain by a respective separation distance, with no reference symbol of the reference signal on any radio resource between that pair of radio resources in the radio resource domain, wherein the first separation distance is a maximum separation distance among the one or more respective separation distances of the one or more pairs included in the first set.

Embodiment 6

The method of any of embodiments 1-5, wherein the second set includes one or more pairs of radio resources that are each separated from one another in the radio resource domain by a respective separation distance, with no reference symbol of the reference signal on any radio resource between that pair of radio resources in the radio resource domain, wherein the second separation distance is a maximum separation distance among the one or more respective separation distances of the one or more pairs included in the second set.

Embodiment 7

The method of any of embodiments 1-6, wherein radio resources on which the reference signal is transmitted or received occur in periodically recurring bursts, wherein the first and second sets of radio resources are included in the same burst.

Embodiment 8

The method of embodiment 7, wherein the first set occurs before the second set in the same burst.

Embodiment 9

The method of any of embodiments 1-6, wherein radio resources on which the reference signal is transmitted or received occur in periodically recurring bursts, wherein the first and second sets of radio resources are included in different bursts.

Embodiment 10

The method of any of embodiments 5-9, wherein transmissions are performed in the wireless communication system according to a time slot structure in which each of multiple time slots includes multiple radio resources in time, wherein a burst spans multiple consecutive time slots.

Embodiment 11

The method of embodiment 10, wherein each of the consecutive time slots spanned by any given burst includes one or more pairs of radio resources on which reference symbols of the reference signal are transmitted or received, with radio resources of each pair in the time slot separated by the same separation distance, wherein any pairs of the radio resources that have different separation distances are included in different time slots of the given burst.

Embodiment 12

The method of any of embodiments 5-9, wherein transmissions are performed in the wireless communication system according to a time slot structure in which each of multiple time slots includes multiple radio resources in time, wherein a burst spans only a single time slot.

Embodiment 13

The method of any of embodiments 1-12, wherein the second separation distance is at least three times as large as the first separation distance Embodiment 14. The method of any of embodiments 1-13, wherein the second separation distance is at least five times as large as the first separation distance.

Embodiment 15

The method of any of embodiments 1-14, wherein the radio resource domain is the time domain.

Embodiment 16

The method of any of embodiments 1-15, wherein the reference symbols of the reference signal comprise Orthogonal Frequency Division Multiplexing (OFDM) symbols.

Embodiment 17

The method of any of embodiments 1-14, wherein the radio resource domain is the frequency domain.

Embodiment 18

The method of any of embodiments 1-17, further comprising transmitting or receiving configuration information indicating a configuration with which the reference symbols of the reference signal are to be transmitted or received on the respective radio resources.

Embodiment 19

The method of embodiment 18, comprising transmitting or receiving the configuration information as dynamic control signaling.

Embodiment 20

The method of any of embodiments 18-19, wherein transmissions are performed in the wireless communication system according to a time slot structure in which each of multiple time slots includes multiple radio resources in time, and comprising transmitting or receiving the configuration information as downlink control information at a beginning of a time slot.

Embodiment 21

The method of any of embodiments 18-19, comprising transmitting or receiving the configuration information as part of broadcast information.

Embodiment 22

The method of any of embodiments 1-21, wherein the reference signal is a tracking reference signal configured for use in tracking receiver frequency offset.

Embodiment 23

The method of any of embodiments 1-22, wherein the radio node is a wireless device.

Embodiment 24

The method of any of embodiments 1-22, wherein the radio node is a radio network node.

Embodiment 25

A radio node configured for use in a wireless communication system, the radio node configured to transmit or receive reference symbols of a reference signal on respective radio resources, including first and second sets of radio resources that differ in at least one radio resource, wherein the first set of radio resources includes a first pair of radio resources that are separated from one another in a radio resource domain by a first separation distance, with no reference symbol of the reference signal on any radio resource between the first pair of radio resources in the radio resource domain, and wherein the second set of radio resources includes a second pair of radio resources that are separated from one another in the radio resource domain by a second separation distance, with no reference symbol of the reference signal on any radio resource between the second pair of radio resources in the radio resource domain, wherein the second separation distance is at least twice as large as the first separation distance, wherein the radio resource domain is a time domain or a frequency domain.

Embodiment 26

The radio node of embodiment 25, configured to perform the method of any of embodiments 2-24.

Embodiment 27

A radio node configured for use in a wireless communication system, the radio node comprising radio circuitry configured to transmit or receive reference symbols of a reference signal on respective radio resources, including first and second sets of radio resources that differ in at least one radio resource, wherein the first set of radio resources includes a first pair of radio resources that are separated from one another in a radio resource domain by a first separation distance, with no reference symbol of the reference signal on any radio resource between the first pair of radio resources in the radio resource domain, and wherein the second set of radio resources includes a second pair of radio resources that are separated from one another in the radio resource domain by a second separation distance, with no reference symbol of the reference signal on any radio resource between the second pair of radio resources in the radio resource domain, wherein the second separation distance is at least twice as large as the first separation distance, wherein the radio resource domain is a time domain or a frequency domain.

Embodiment 28

The radio node of embodiment 27, configured to perform the method of any of embodiments 2-24.

Embodiment 29

A radio node configured for use in a wireless communication system, the radio node comprising a radio module for transmitting or receiving reference symbols of a reference signal on respective radio resources, including first and second sets of radio resources that differ in at least one radio resource, wherein the first set of radio resources includes a first pair of radio resources that are separated from one another in a radio resource domain by a first separation distance, with no reference symbol of the reference signal on any radio resource between the first pair of radio resources in the radio resource domain, and wherein the second set of radio resources includes a second pair of radio resources that are separated from one another in the radio resource domain by a second separation distance, with no reference symbol of the reference signal on any radio resource between the second pair of radio resources in the radio resource domain, wherein the second separation distance is at least twice as large as the first separation distance, wherein the radio resource domain is a time domain or a frequency domain.

Embodiment 30

The radio node of embodiment 29, comprising one or more modules for performing the method of any of embodiments 2-24.

Embodiment 31

A computer program comprising instructions which, when executed by at least one processor of a radio node, causes the radio node to carry out the method of any of embodiments 1-24.

Embodiment 32

A carrier containing the computer program of embodiment 31, wherein the carrier is one of an electronic signal, optical signal, radio signal, or computer readable storage medium.

Embodiment 33

A method performed by a radio node configured for use in a wireless communication system, the method comprising transmitting or receiving reference symbols of a reference signal on respective reference signal radio resources, including first and second sets of reference signal radio resources that differ in at least one reference signal radio resource and that differ in a maximum separation distance between consecutive reference signal radio resources in a radio resource domain, wherein the maximum separation distance of the second set is at least twice as large as the maximum separation distance of the first set, wherein the radio resource domain is a time domain or a frequency domain.

Embodiment 34

A method performed by a radio node configured for use in a wireless communication system, the method comprising transmitting or receiving reference symbols of a reference signal on respective reference signal radio resources, including first and second sets of reference signal radio resources that differ in at least one reference signal radio resource and that differ in a density with which reference signal radio resources occur in a radio resource domain, wherein the density of the first set is at least twice as high as the density of the second set, wherein the radio resource domain is a time domain or a frequency domain.

Embodiment 35

The method of embodiment 34, wherein the first and second sets differ in a maximum separation distance between consecutive reference signal radio resources in the radio resource domain, wherein the maximum separation distance of the second set is at least twice as large as the maximum separation distance of the first set.

Embodiment 36

A method performed by a radio node configured for use in a wireless communication system, the method comprising transmitting or receiving reference symbols of a reference signal on respective reference signal radio resources, including first and second sets of reference signal radio resources that differ in at least one reference signal radio resource and that differ in a density with which reference signal radio resources occur in a radio resource domain, wherein reference signal radio resources on which the reference signal is transmitted or received occur in bursts that periodically recur in the radio resource domain, wherein the radio resource domain is a time domain or a frequency domain.

Embodiment 37

The method of embodiment 36, wherein the periodically recurring bursts are non-contiguous in the radio resource domain.

Embodiment 38

The method of any of embodiments 36-37, wherein the radio resource domain is the time domain.

Embodiment 39

The method of any of embodiments 36-38, wherein the first and second sets of radio resources are included in the same burst.

Embodiment 40

The method of any of embodiments 36-38, wherein the first and second sets of radio resources are included in different bursts.

Embodiment 41

The method of any of embodiments 36-40, wherein at least one radio resource included in the first set is also included in the second set.

Embodiment 42

The method of any of embodiments 36-41, wherein the first set of radio resources is a subset of the second set of radio resources.

Embodiment 43

A method performed by a wireless device configured for use in a wireless communication system, the method comprising receiving reference symbols of a reference signal on respective radio resources, including receiving a first pair of the reference symbols on a first pair of radio resources that are separated from one another in a radio resource domain by a first separation distance, with no reference symbol of the reference signal received on any radio resource between the first pair of radio resources in the radio resource domain, and receiving a second pair of the reference symbols on a second pair of radio resources that are separated from one another in the radio resource domain by a second separation distance, with no reference symbol of the reference signal received on any radio resource between the second pair of radio resources in the radio resource domain, wherein the second separation distance is at least twice as large as the first separation distance, wherein the radio resource domain is a time domain or a frequency domain.

Embodiment 44

A method performed by radio network node configured for use in a wireless communication system, the method comprising transmitting reference symbols of a reference signal on respective radio resources, including transmitting a first pair of the reference symbols on a first pair of radio resources that are separated from one another in a radio resource domain by a first separation distance, with no reference symbol of the reference signal transmitted on any radio resource between the first pair of radio resources in the radio resource domain, and transmitting a second pair of the reference symbols on a second pair of radio resources that are separated from one another in the radio resource domain by a second separation distance, with no reference symbol of the reference signal transmitted on any radio resource between the second pair of radio resources in the radio resource domain, wherein the second separation distance is at least twice as large as the first separation distance, wherein the radio resource domain is a time domain or a frequency domain.

Embodiment 45

A radio node configured to perform the method of any of embodiments 33-44.

The invention claimed is:

1. A method performed by a wireless device configured for use in a wireless communication system, the method comprising:
   receiving reference symbols of a reference signal on respective radio resources, including first and second sets of radio resources that differ in at least one radio resource, wherein the first set of radio resources includes a first pair of radio resources that are separated from one another in a radio resource domain by a first separation distance, with no reference symbol of the reference signal on any radio resource between the first pair of radio resources in the radio resource domain, and wherein the second set of radio resources includes a second pair of radio resources that are separated from one another in the radio resource domain by a second separation distance, with no reference symbol of the reference signal on any radio resource between the second pair of radio resources in the radio resource domain, wherein the second separation distance is at least twice as large as the first separation distance, wherein the first set of radio resources is a subset of the second set of radio resources; and
   performing frequency estimation in two steps, wherein in a first step, a first frequency is estimated based on reference symbols of the first set of radio resources, and in a second step, a second frequency is estimated based on reference symbols of the second set of radio resources and the first frequency estimate.

2. The method of claim 1, wherein the reference signal is a tracking reference signal configured for use in tracking receiver frequency offset.

3. The method of claim 2, wherein radio resources on which the reference signal is transmitted or received occur in periodically recurring bursts, wherein the first and second sets of radio resources are included in the same burst.

4. The method of claim 3, wherein transmissions are performed in the wireless communication system according to a time slot structure in which each of multiple time slots includes multiple radio resources in time, wherein a burst spans multiple consecutive time slots.

5. The method of claim 4, wherein each of the consecutive time slots spanned by any given burst includes one or more pairs of radio resources on which reference symbols of the reference signal are transmitted or received, with radio resources of each pair in the time slot separated by the same separation distance, wherein any pairs of the radio resources that have different separation distances are included in different time slots of the given burst.

6. A radio network node configured for use in a wireless communication system, the radio network node comprising:
   radio circuitry configured to transmit to a wireless device reference symbols of a reference signal on respective radio resources, including first and second sets of radio resources that differ in at least one radio resource, wherein the first set of radio resources includes a first pair of radio resources that are separated from one another in a radio resource domain by a first separation distance, with no reference symbol of the reference signal on any radio resource between the first pair of radio resources in the radio resource domain, and wherein the second set of radio resources includes a second pair of radio resources that are separated from one another in the radio resource domain by a second separation distance, with no reference symbol of the reference signal on any radio resource between the second pair of radio resources in the radio resource domain, wherein the second separation distance is at least twice as large as the first separation distance, wherein the radio resource domain is a time domain or a frequency domain, wherein the first set of radio resources is a subset of the second set of radio resources; and processing circuitry configured to configure the wireless device to perform frequency estimation in two steps, wherein a first frequency is to be estimated based on reference symbols of the first set of radio resources, and in a second step, a second frequency is to be estimated based on reference symbols of the second set of radio resources and the first frequency estimate.

7. The radio network node of claim 6, wherein radio resources on which the reference signal is transmitted or received occur in periodically recurring bursts, wherein the first and second sets of radio resources are included in the same burst.

8. The radio network node of claim 7, wherein transmissions are performed in the wireless communication system according to a time slot structure in which each of multiple time slots includes multiple radio resources in time, wherein a burst spans multiple consecutive time slots.

9. The method of claim 3, wherein the first set occurs before the second set in the same burst.

10. The method of claim 1, further comprising receiving configuration information indicating a configuration with which the reference symbols of the reference signal are to be received on the respective radio resources.

11. The radio network node of claim 7, wherein the first set occurs before the second set in the same burst.

12. The radio network node of claim 8, wherein each of the consecutive time slots spanned by any given burst includes one or more pairs of radio resources on which reference symbols of the reference signal are transmitted or received, with radio resources of each pair in the time slot separated by the same separation distance, wherein any pairs of the radio resources that have different separation distances are included in different time slots of the given burst.

13. A wireless device configured for use in a wireless communication system, the wireless device comprising:
radio circuitry configured to receive reference symbols of a reference signal on respective radio resources, including first and second sets of radio resources that differ in at least one radio resource, wherein the first set of radio resources includes a first pair of radio resources that are separated from one another in a radio resource domain by a first separation distance, with no reference symbol of the reference signal on any radio resource between the first pair of radio resources in the radio resource domain, and wherein the second set of radio resources includes a second pair of radio resources that are separated from one another in the radio resource domain by a second separation distance, with no reference symbol of the reference signal on any radio resource between the second pair of radio resources in the radio resource domain, wherein the second separation distance is at least twice as large as the first separation distance, wherein the first set of radio resources is a subset of the second set of radio resources; and processing circuitry configured to perform frequency estimation in two steps, wherein in a first step, a first frequency is estimated based on reference symbols of the first set of radio resources, and in a second step, a second frequency is estimated based on reference symbols of the second set of radio resources and the first frequency estimate.

14. The wireless device of claim 13, wherein the reference signal is a tracking reference signal configured for use in tracking receiver frequency offset.

15. The wireless device of claim 14, wherein radio resources on which the reference signal is transmitted or received occur in periodically recurring bursts, wherein the first and second sets of radio resources are included in the same burst.

16. The wireless device of claim 15, wherein transmissions are performed in the wireless communication system according to a time slot structure in which each of multiple time slots includes multiple radio resources in time, wherein a burst spans multiple consecutive time slots.

17. The wireless device of claim 16, wherein each of the consecutive time slots spanned by any given burst includes one or more pairs of radio resources on which reference symbols of the reference signal are transmitted or received, with radio resources of each pair in the time slot separated by the same separation distance, wherein any pairs of the radio resources that have different separation distances are included in different time slots of the given burst.

18. The wireless device of claim 15, wherein the first set occurs before the second set in the same burst.

19. The wireless device of claim 13, wherein the radio circuitry is further configured to receive configuration information indicating a configuration with which the reference symbols of the reference signal are to be received on the respective radio resources.

20. A method performed by a radio network node configured for use in a wireless communication system, the method comprising:
transmitting to a wireless device reference symbols of a reference signal on respective radio resources, including first and second sets of radio resources that differ in at least one radio resource, wherein the first set of radio resources includes a first pair of radio resources that are separated from one another in a radio resource domain by a first separation distance, with no reference symbol of the reference signal on any radio resource between the first pair of radio resources in the radio resource domain, and wherein the second set of radio resources includes a second pair of radio resources that are separated from one another in the radio resource domain by a second separation distance, with no reference symbol of the reference signal on any radio resource between the second pair of radio resources in the radio resource domain, wherein the second separation distance is at least twice as large as the first separation distance, wherein the radio resource domain is a time domain or a frequency domain, wherein the first set of radio resources is a subset of the second set of radio resources; and configuring the wireless device to perform frequency estimation in two steps, wherein a first frequency is to be estimated based on reference symbols of the first set of radio resources, and in a second step, a second frequency is to be estimated based on reference symbols of the second set of radio resources and the first frequency estimate.

21. The method of claim 20, wherein radio resources on which the reference signal is transmitted or received occur in periodically recurring bursts, wherein the first and second sets of radio resources are included in the same burst.

22. The method of claim 21, wherein the first set occurs before the second set in the same burst.

23. The method of claim 21, wherein transmissions are performed in the wireless communication system according to a time slot structure in which each of multiple time slots includes multiple radio resources in time, wherein a burst spans multiple consecutive time slots.

24. The method of claim 23, wherein each of the consecutive time slots spanned by any given burst includes one or more pairs of radio resources on which reference symbols of the reference signal are transmitted or received, with radio resources of each pair in the time slot separated by the same separation distance, wherein any pairs of the radio resources that have different separation distances are included in different time slots of the given burst.

\* \* \* \* \*